United States Patent
Kwok

(10) Patent No.: US 10,699,376 B1
(45) Date of Patent: Jun. 30, 2020

(54) EMIRROR WITH 3-IN-1 STITCHING BY NON-RECTILINEAR WARPING OF CAMERA VIEWS

(71) Applicant: Ambarella International LP, Santa Clara, CA (US)

(72) Inventor: Wilson Kwok, Santa Clara, CA (US)

(73) Assignee: Ambarella International LP, Santa Clara, CA (US)

(*) Notice: Subject to any disclaimer, the term of this patent is extended or adjusted under 35 U.S.C. 154(b) by 103 days.

(21) Appl. No.: 16/150,490

(22) Filed: Oct. 3, 2018

(51) Int. Cl.
*G06K 9/00* (2006.01)
*G06T 3/40* (2006.01)
*B60R 1/12* (2006.01)
*G06T 3/00* (2006.01)

(52) U.S. Cl.
CPC .............. *G06T 3/4038* (2013.01); *B60R 1/12* (2013.01); *G06T 3/0018* (2013.01); *G06T 3/0093* (2013.01); *B60R 2001/1253* (2013.01)

(58) Field of Classification Search
CPC ....... B60R 1/00; B60R 1/12; B60R 2300/105; B60R 2300/302; B60R 2300/303; B60R 2300/802; G06T 3/4038; H04N 5/247; G06K 9/00791; B60Q 1/525; B60Q 1/46
See application file for complete search history.

(56) References Cited

U.S. PATENT DOCUMENTS

| | | | | |
|---|---|---|---|---|
| 9,270,976 B2* | 2/2016 | Houvener | ............... | G03B 35/08 |
| 9,386,302 B2* | 7/2016 | Zeng | ........................ | G06T 7/80 |
| 9,569,874 B2* | 2/2017 | Lin | ....................... | G06K 9/4609 |
| 9,723,272 B2* | 8/2017 | Lu | ........................... | H04N 7/181 |
| 10,259,383 B1* | 4/2019 | Campbell | .............. | H04N 5/247 |
| 10,284,818 B2* | 5/2019 | Lu | ........................... | H04N 7/181 |
| 10,518,702 B2* | 12/2019 | Al Rasheed | .............. | B60R 1/00 |
| 2016/0358355 A1* | 12/2016 | Lin | ..................... | G06K 9/6211 |
| 2020/0090516 A1* | 3/2020 | Sert | .................... | G06K 9/00812 |
| 2020/0090519 A1* | 3/2020 | Ding | ................. | G06K 9/00812 |

OTHER PUBLICATIONS

Boerlu, "BMW i8 shows Mirrorless Camera Technology", 2016, pp. 1-5.

* cited by examiner

*Primary Examiner* — Amir Alavi
(74) *Attorney, Agent, or Firm* — Christopher P. Maiorana, PC

(57) ABSTRACT

An apparatus includes an interface and a processor. The interface may be configured to receive video frames corresponding to an exterior view of a vehicle generated by a plurality of capture devices. The processor may be configured to perform digital warping on the video frames, generate distorted video frames in response to the digital warping, perform video stitching operations on the distorted video frames and generate panoramic video frames in response to the video stitching operations. The digital warping may be performed to adjust the video frames based on lens characteristics of the capture devices. An amount of the digital warping applied may be selected to provide a size continuity of objects in the distorted video frames at a stitching seam in the panoramic video frames. The panoramic video frames may be generated to fit a size of a display.

19 Claims, 15 Drawing Sheets

EMIRROR WITH 3-IN-1 STITCHING BY NON-RECTILINEAR WARPING OF CAMERA VIEWS

FIELD OF THE INVENTION

The invention relates to video capture devices generally and, more particularly, to a method and/or apparatus for implementing an eMirror with 3-in-1 stitching by non-rectilinear warping of camera views.

BACKGROUND

As vehicle technology advances, the traditional automotive optical mirror configuration (i.e., consisting of a center rear-view mirror mounted inside the car, plus a driver-side mirror and a passenger-side mirror mounted outside the car) can be replaced with electronic mirrors (i.e., video screens displaying video data). Electronic mirrors offer several advantages over traditional optical mirrors. A rear-view camera mounted behind the car can provide a clearer unobstructed view of what is outside and behind the car. The rear-view obstructions caused by the interior car roof, pillars, rear seats/headrests, passengers, and trunk/hatch (i.e., storage) area would be eliminated. Side mirrors take up physical space extending about 8 to 10 inches further than the sides of the car body. Cameras replacing the side mirrors can take up much less space (i.e., about 1 to 2 inches), while offering less aerodynamic drag and are less prone to hitting (or being hit by) other objects. Cameras can also provide the driver with clearer images that are better exposed under varied lighting conditions compared to optical mirrors, which have images with insufficient contrast that can be too dark or too bright.

Electronic mirrors with three separate cameras along with a computer display panel that replace optical mirrors are often referred to as an eMirror. For an eMirror, there are issues of how to present the three camera views of visual information to the driver. One presentation option displays the entirety of each camera view tiled together on the eMirror display. However, tiling the camera views results in a view that is disjointed, separated, and/or has redundant image information that the driver has to visually sort through and process, resulting in a cluttered and distracting display.

In another presentation option each of the 3 camera views undergo some warping and scaling, and are then placed into assigned areas where they are stitched together to become the final display. The scaling results in a large 'invalid' area that does not correspond to any camera view. The invalid area might have a silhouette of a car representing the ego car drawn as an overlay to provide spatial reference relative to other vehicles/objects in the scene portrayed by the valid camera areas of the eMirror display. The scaling also results in a rear view area that is significantly smaller than the side view area. The reason for the small rear view and the large invalid area is due to the distance difference between the mounting locations of the rear camera and the side cameras.

It would be desirable to implement an eMirror with 3-in-1 stitching by non-rectilinear warping of camera views.

SUMMARY

The invention concerns an apparatus comprising an interface and a processor. The interface may be configured to receive video frames corresponding to an exterior view of a vehicle generated by a plurality of capture devices. The processor may be configured to perform digital warping on the video frames, generate distorted video frames in response to the digital warping, perform video stitching operations on the distorted video frames and generate panoramic video frames in response to the video stitching operations. The digital warping may be performed to adjust the video frames based on lens characteristics of the capture devices. An amount of the digital warping applied may be selected to provide a size continuity of objects in the distorted video frames at a stitching seam in the panoramic video frames. The panoramic video frames may be generated to fit a size of a display.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an eMirror that may (i) implement video stitching to provide a 3-in-1 panoramic video output, (ii) utilize non-rectilinear warping of camera views, (iii) compensate for distance differences between capture devices, (iv) present a stitched video frame that maintains size continuity at stitching seams, (v) minimize an invalid area of an eMirror display, (vi) increase a viewable area for a rear view and/or (vii) be implemented as one or more integrated circuits.

The goal of "3-in-1" video stitching for an eMirror display is to present a back camera view behind a car together with each of the 2 side camera views in an integrated/fused fashion as a single (e.g., panoramic) image on the eMirror display. The panoramic video may be more visually useful and/or appealing user-interface. In an example, a driver may be able to survey the vehicle surroundings with a quick glance to observe the important scene information (e.g., nearby vehicles and objects). A logical and visually coherent display may enable the driver to react quickly in handling driving situations. Embodiments of the invention may generate stitched and/or panoramic video frames that provide the visually coherent display by performing video operations that provide continuity of the size of objects at the stitching seams.

Rectilinear refers to the perspective images generated from each camera having straight lines in the horizontal, vertical, and depth dimensions in the real 3D world also appearing as straight lines in the captured camera image video frames. Non-rectilinear images may have a barrel/fisheye distortion. In one example, non-rectilinear images may be generated as a result of lens characteristics. In another example, the non-rectilinear images may be generated in response to a warping video operation on the rectilinear image.

The non-rectilinear images may result in a gradual shrinking in height of objects at locations moving horizontally away from the center of the image. The non-rectilinear effects result in objects located even further away from the center of the non-rectilinear image having an even smaller vertical size. Another consequence of the non-rectilinear distortion may be that real-world horizontal lines become imaged as increasingly curved lines at closer distances from a camera. In one example, a horizon line out at an infinite distance from a camera may remain imaged and appear as a straight horizontal line. However, at close distances, the horizontal lines may appear curved. Generally, for non-rectilinear image characteristics objects become continuously and gradually scaled down in size the further the objects are from the center of the image.

Figure 1:
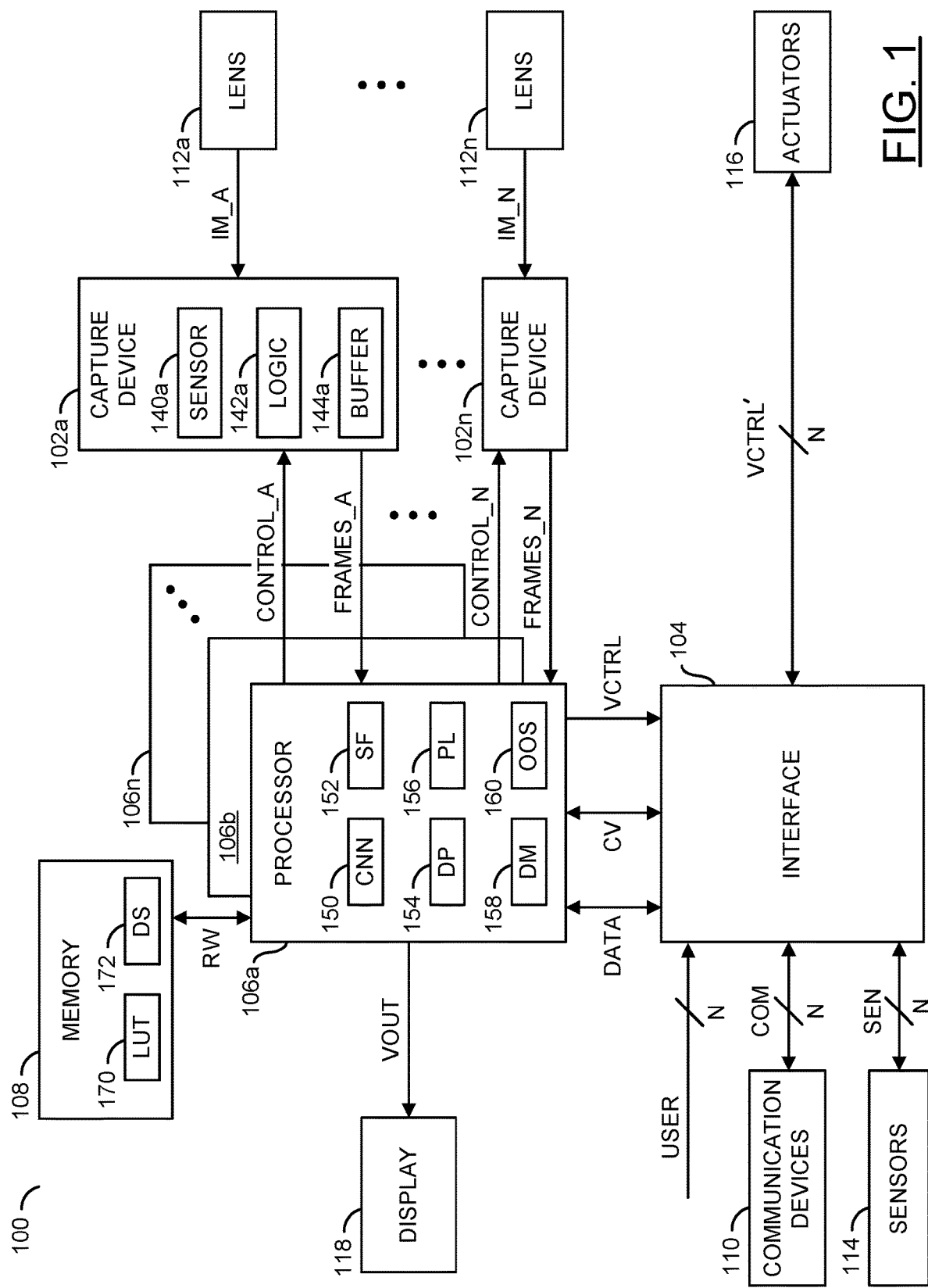
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., the eMirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n. The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
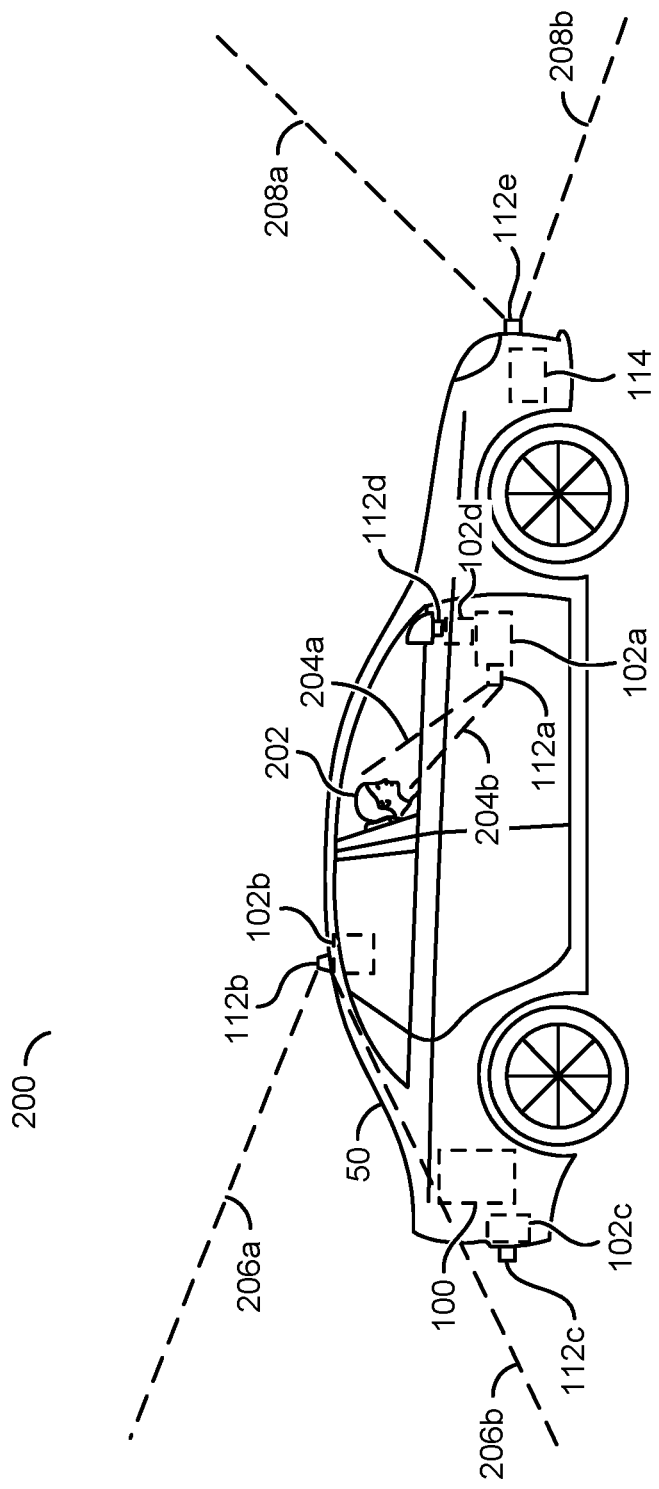
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a motorcycle, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
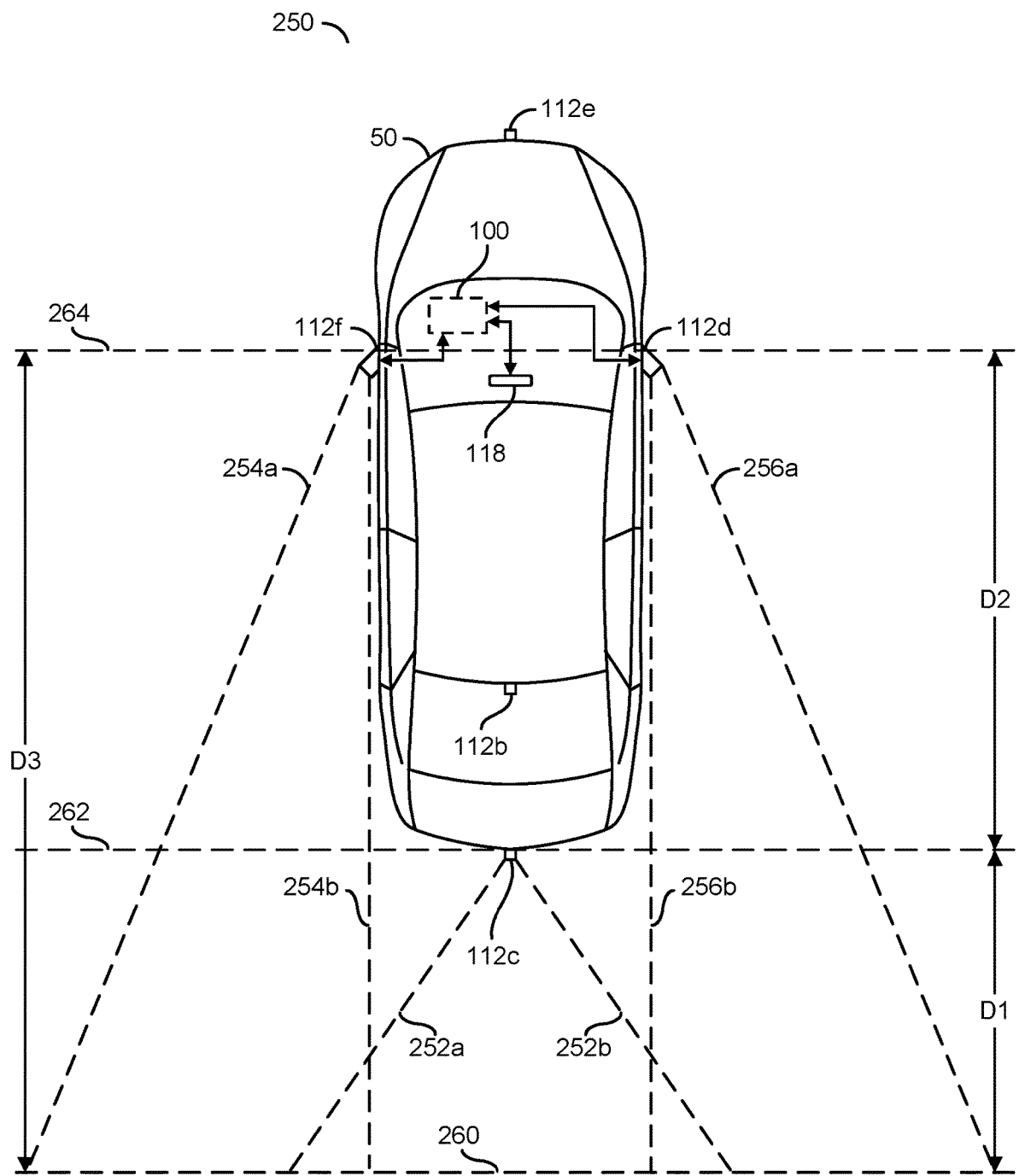
FIG. 3 is a diagram illustrating distances between side mounted cameras and a rear camera.

Referring to FIG. 3, a diagram illustrating distances between side mounted cameras and a rear camera are shown. An overhead view 250 of the vehicle 50 is shown. The apparatus 100 and the display 118 are shown within the vehicle 50. The lenses 112b-112f are shown located on the outside body of the vehicle 50. In the example shown, the lens 112c may capture video data from a rear (e.g., bumper) of the vehicle 50, the lens 112d may capture video data from a passenger side of the vehicle 50 and the lens 112f may capture video data from a driver side of the vehicle 50.

Lines 252a-252b are shown extending from the lens 112c. The lines 252a-252b may represent a field of view of the rear camera lens 112c. Lines 254a-254b are shown extending from the lens 112f. The lines 254a-254b may represent a field of view of the driver side camera lens 112f. Lines 256a-256b are shown extending from the lens 112d. The lines 256a-256b may represent a field of view of the passenger side camera lens 112d. The field of view lines 252a-252b, 254a-254b and/or 256a-256b are shown for illustrative purposes. For example, the field of view lines 252a-252b, 254a-254b and/or 256a-256b may extend from the lenses 112c, 112d and/or 112f at a wider angle (e.g., the lenses 112c, 112d and/or 112f may be wide angle lenses). The arrangement of the lens 112c, the lens 112d and/or the lens 112f and/or the field of view 252a-252b, the field of view 254a-254b and/or the field of view 256a-256b may be varied according to the design criteria of a particular implementation.

A line 260 is shown. The line 260 may be a reference location. The reference location 260 is shown behind the vehicle 50. A line 262 is shown. The line 262 may be a reference location corresponding to the rear lens 112c. A line 264 is shown. The line 264 may be a reference location corresponding to the passenger side lens 112d and/or the driver side lens 112f.

A distance D1 is shown. The distance D1 may be a distance between the reference location 260 and the reference location 262. A distance D2 is shown. The distance D2 may be a distance between the reference location 262 and the reference location 264. A distance D3 is shown. The distance D3 may be a distance between the reference location 260 and the reference location 264. In the example shown, the distance D1 may be shorter than the distance D3. In an example, there may be approximately a three meter distance between the location of the passenger/driver lenses (e.g., 112d and 112f) and the rear lens 112c. For example, the distance D2 may be approximately three meters.

In an example, the rear capture device 102c (e.g., corresponding to the rear lens 112c), the passenger capture device 102d (e.g., corresponding to the passenger lens 112d) and the driver capture device 102f (e.g., corresponding to the driver lens 112f) may each have the same focal length. In an example, the focal length may be 4.6 mm. If an object located at the reference location 260 is captured by the rear lens 112c, the passenger lens 112d and the driver lens 112f, the object may appear different sizes in the captured video frames because of the distance D2 between the lenses.

In an example, a wall situated at the reference location 260 may have a checkerboard pattern of equally-sized black and white squares (e.g., approximately three meters behind the car 50) and each of the cameras (e.g., the capture device 102c, the capture device 102d and the capture device 102f) may have the same focal length lenses and sensors. The video frames captured by the rear camera 102c will have a fewer number of larger checkerboard squares imaged compared to the video frames captured by the driver side capture device 102f and the video frames captured by the passenger side capture device 102d. The video frames captured by the driver side capture device 102f and the video frames captured by the passenger side capture device 102d will have a greater number of smaller checkerboard squares imaged compared to the video frames captured by the rear capture device 102c. The difference in size of the checkerboard squares imaged may result because the wall at the reference location 260 may be three meters away from the rear camera 102c, but approximately six meters away from the side cameras (e.g., 102d and 102f).

One example method to achieve having an object (e.g. the checkerboard squares) at the reference location 260 appear to be the same size across all camera views, the rectilinear video frames captured by the rear camera 102c may be scaled down. The processors 106a-106n (e.g., by performing video operations in the video pipeline 156) may scale down the rectilinear video frames (e.g., FRAMES_C) captured by the rear capture device 102c in order to make objects that appear across the different camera views (e.g., at a stitching seam) appear to have similar sizes. Scaling the rectilinear video frames down so that objects have a similar size between different camera views may be desirable in the sense that an object moving across camera views in the 3-in-1 stitched display would be visually disorienting to the driver 202 if there is a large discontinuous change in size of the object moving across the stitching seam. However, the down-scaling of the rectilinear video frames captured by the rear camera 102c has a consequence of a large 'invalid' adjacent area at the top and/or bottom of the reduced-sized rear camera image (e.g., caused by the scaled down rectilinear video frames from the rear capture device 102c having a smaller size than the other capture devices 102d and 102f).

In some embodiments, a wider-angle (e.g., shorter focal length) rear camera lens 112c may be selected that is different than the side camera lenses (e.g., 112d and 112f). The shorter focal length rear camera lens 112c may be used to effectively perform the rear camera image size reduction. Selecting the shorter focal length for the rear camera lens 112c may result in the down-scaling of the video frames captured by the rear camera 102c in an optical manner rather than as a digital image resizing operation performed by the processors 106a-106n. However, whether the down-scaling is performed digitally or optically, the same 'invalid' area may result (e.g., and be masked) to convey the correct sense of spatial relationship of objects in the camera areas relative to the vehicle 50. The apparatus 100 may be configured to reduce the invalid area and/or generate an output to the display 118 without (or with much less) down-scaling. For example, by implementing the apparatus 100, the rear camera area of the display 118 may not be relegated to be a small portion of the entire area of the eMirror display 118.

The video operations performed by the processors 106a-106n and/or selecting the appropriate lens characteristics of the rear camera lens 112c, the driver side lens 112f and the passenger side lens 112d may prevent objects/vehicles present behind the rear view camera 102c from being displayed in the final eMirror output in a shrunken manner (e.g., with low resolution). The apparatus 100 may present the panoramic (e.g., stitched three-in-one) video frames that prevent the video frames generated by the rear camera 102c from occupying only a very small portion of the entire eMirror display 118. The apparatus 100 may be configured to avoid a large wasted 'invalid' eMirror display area that conveys no scene information to the driver 202. By preventing the large invalid area, the apparatus 100 may enable the driver 202 to more easily judge distances of objects when looking at the display 118.

Figure 4:
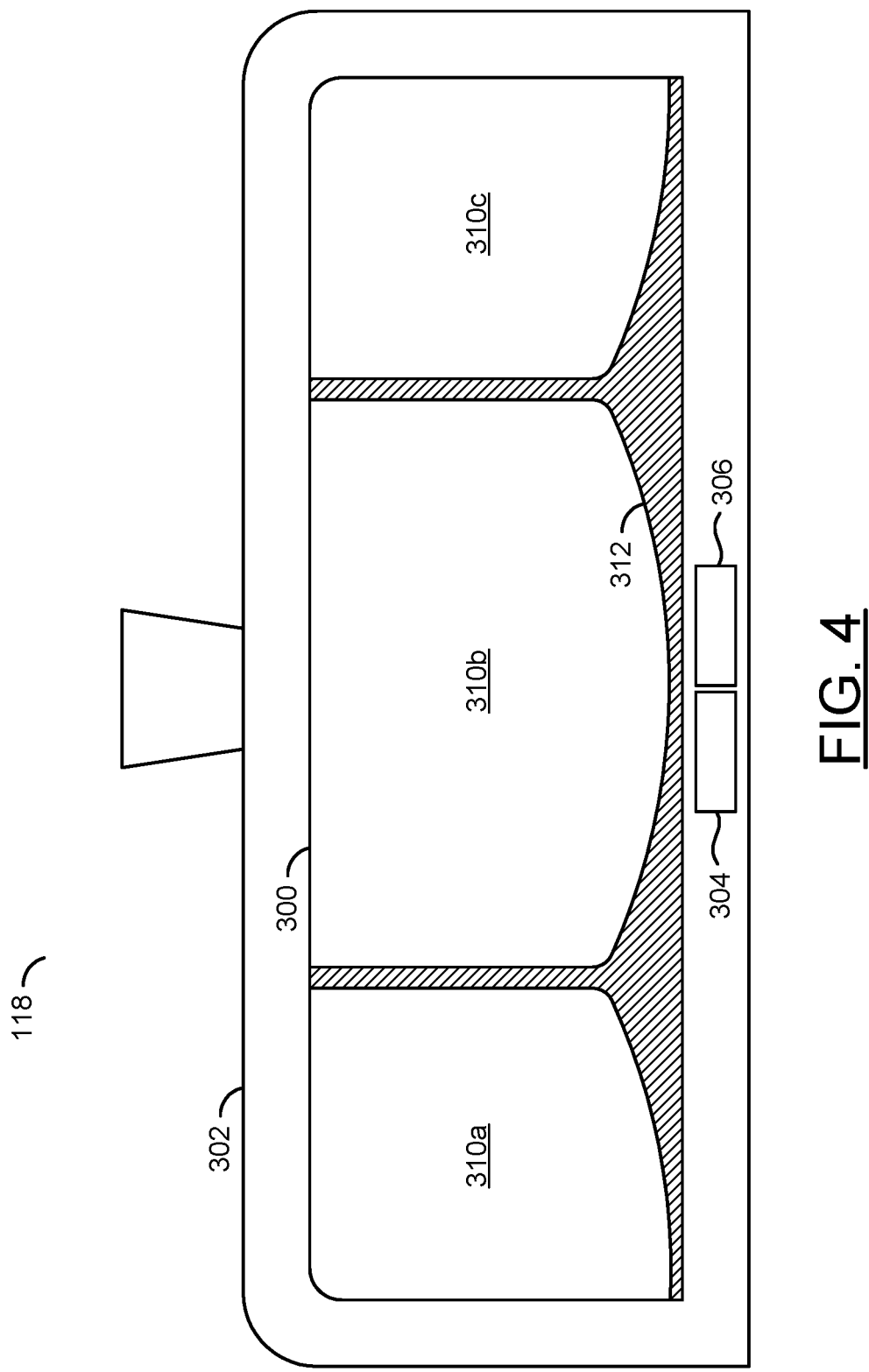
FIG. 4 is a diagram illustrating an example embodiment of an eMirror display.

Referring to FIG. 4, a diagram illustrating an example embodiment of the eMirror display 118 is shown. The eMirror display 118 may output (e.g., display) a panoramic video frame 300. The panoramic video frame 300 may be generated by the processors 106a-106n in response to the video frames (e.g., FRAMES_A-FRAMES_N) generated by the capture devices 102a-102n. For example, the signal VOUT may provide the panoramic video frame 300.

The eMirror display 118 may comprise a bezel 302. The panoramic video frame 300 may be displayed within the framing created by the bezel 302. A button 304 and a button 306 is shown on the bezel 302. The button 304 and/or the button 306 may be configured to control various features of the eMirror display 118 (e.g., contrast adjustment, brightness adjustment, view selection, zoom control, data overlay for the panoramic video frame 300 such as numerical distances, etc.). In some embodiments, the eMirror display 118 may implement a touchscreen interface for controlling the various features (e.g., instead of and/or to supplement the button 304 and the button 306). In some embodiments, the eMirror display 118 may be implemented without the bezel 118 (e.g., edge-to-edge screen). The style, design and/or functionality implemented by the eMirror display 118 may be varied according to the design criteria of a particular implementation.

In the example shown, the panoramic video frame 300 may comprise three portions 310a-310c and an invalid area 312. The three portions 310a-310c may comprise video frames captured by the capture devices 102a-102n that have been stitched together by the processors 106a-106n to form the output panoramic video frame 300. In the example shown in association with FIG. 3, the portion 310a may correspond with the video frames FRAMES_F generated by the driver side capture device 102f, the portion 310b may correspond with the video frames FRAMES_C generated by the rear capture device 102c and the portion 310c may correspond with the video frames FRAMES_D generated by the passenger side capture device 102d. The size and/or shape of the portions 310a-310c and/or the invalid area 312 may be varied according to the design criteria of a particular implementation.

The processors 106a-106n may be configured to perform video operations (e.g., warping and/or scaling) of the video frames captured by the capture devices (e.g., 102c, 102d and 102f) corresponding to the lenses 112c, 112d and 112f of the vehicle 50. The video operations may further comprise video stitching to stitch the video frames (e.g., FRAMES_F, FRAMES_C and FRAMES_D) to generate the panoramic video frames 300. The processors 106a-106n may place the captured video frames into the assigned areas and stitch the video frames together to provide the final display for the panoramic video frames 300. The video operations performed by the processors 106a-106n may be configured to generate the panoramic video frames 300 to fit the size and/or shape of the eMirror display 118. The eMirror display 118 may receive the signal VOUT and output the panoramic video frames 300.

The invalid area 312 may be a portion of the panoramic video frame 300 that does not display video data. For example, the invalid area 312 may comprise blank information (e.g., null video data) and/or masking. The invalid area 312 may comprise portions of the video frames (e.g., FRAMES_F, FRAMES_C and FRAMES_D) that overlap and/or result in other visual artifacts when the stitching operations are performed by the video processors 106a-106n. For example, the invalid area 312 may be intelligently selected by the processors 106a-106n to prevent visual distractions from appearing in the panoramic video frames 300. The visual distractions may cause the driver 202 difficulty and/or confusion when viewing the panoramic video frames 300.

The invalid area 312 may be an area that does not correspond to any of the camera views. In some embodiments, the invalid area 312 may comprise a mask such as a silhouette of a car representing the vehicle 50 drawn as an overlay to provide spatial reference relative to other vehicles/objects in the panoramic video 300 by the valid camera areas 310a-310c of the eMirror display 118. The apparatus 100 may be configured to generate the panoramic video frames 300 without having the rear view portion 310b appear significantly smaller than the side view areas 310a and 310c. The apparatus 100 may be configured to generate the panoramic video frames with a small invalid area 312. The apparatus 100 may be configured to compensate for the distance difference between the mounting locations of the rear camera 102c and the side cameras 102d and 102f without downscaling the video frames relative to each other.

In some embodiments, the processors 106a-106n may be configured to implement adaptive stitching locations boundaries. For example, the processors 106a-106n may be configured to adapt the stitching location boundary between the rear view area 310b and side view area 310a and the stitching location boundary between the rear view area 310b and the side view area 310c. The stitching boundaries may each adapt within a range. For example, the processors 106a-106n may determine whether the rear view 310b or the side views 310a or 310c contain more relevant content about vehicles/objects in the spatial range. For example, the CNN module 150 may perform object detection to determine which objects are in the spatial range, and the decision module 158 may determine which objects are more relevant.

Figure 5:
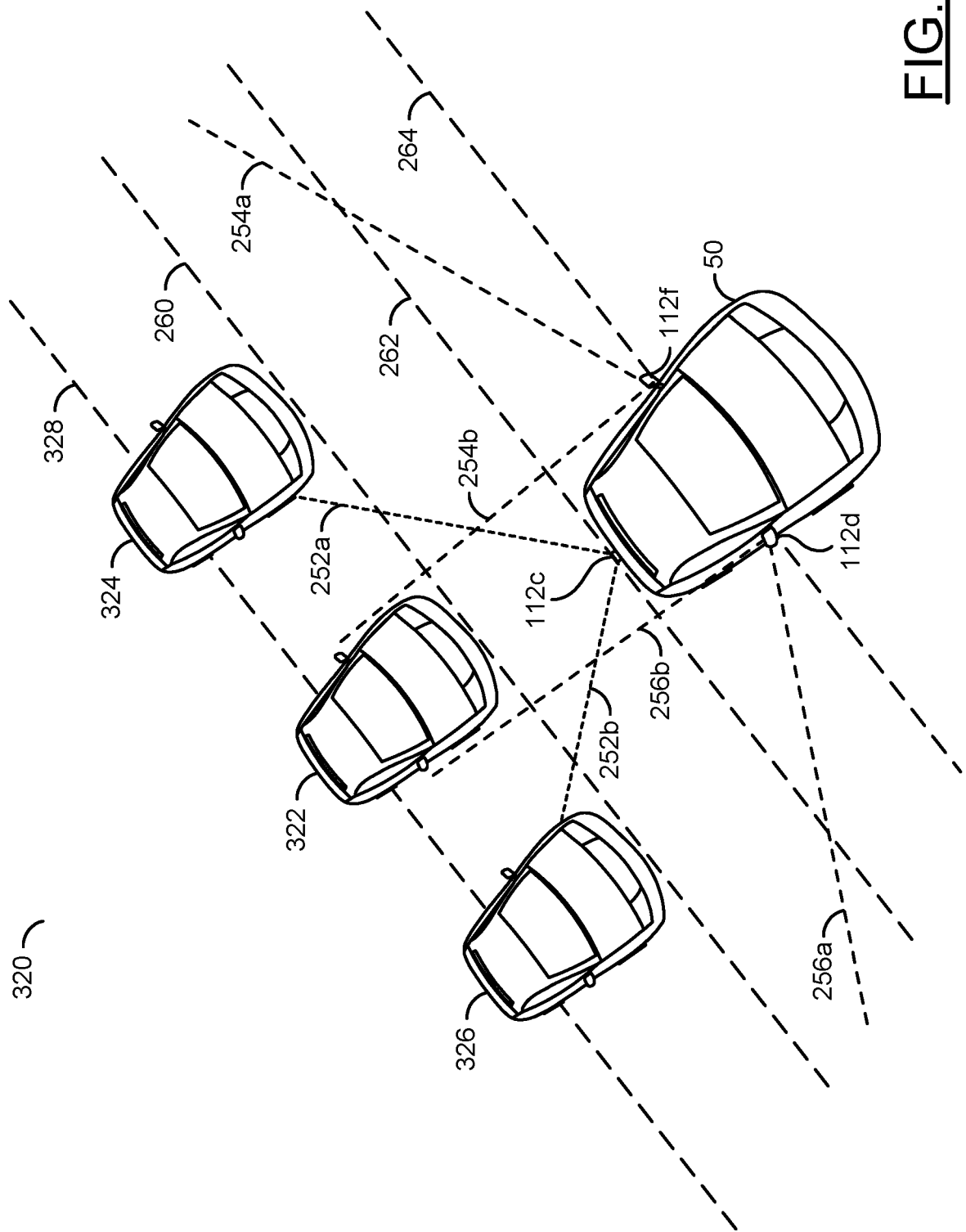
FIG. 5 is a diagram illustrating an example driving scenario.

Referring to FIG. 5, a diagram illustrating an example driving scenario 320 is shown. The vehicle 50 is shown in the driving scenario 320. The side view camera lenses 112d and 112f are shown on the vehicle 50 at the reference location 264. The rear camera lens 112c is shown at the reference location 262. For example, the lens 112c may be at a nominal location corresponding to the rear center tail-light location of the vehicle 50 and the lenses 112d and 112f may be at nominal locations corresponding to locations of traditional side mirrors. The field of view 254a-254b of the driver side lens 112f is shown. The field of view 256a-256b of the passenger side lens 112d is shown. The field of view 252a-252b of the rear lens 112c is shown.

A vehicle 322, a vehicle 324 and a vehicle 326 are shown in the example scenario 320. The vehicle 322, the vehicle 324 and the vehicle 326 are shown behind the vehicle 50, generally at the reference location 260. A line 328 is shown.

The line 328 may be a reference location. In the example scenario 320, a front end of the vehicles 322-326 may be at the reference location 260 and a rear end of the vehicles 322-326 may be at the reference location 328. The vehicle 322 may be directly behind the vehicle 50 at the reference location 260. The vehicle 324 may be behind the vehicle 50 at the reference location 260 and one lane over (e.g., one lane to the left side of the vehicle 50 from the perspective of the driver 220). The vehicle 326 may be behind the vehicle 50 at the reference location 260 and one lane over (e.g., one lane to the right side of the vehicle 50 from the perspective of the driver 220). In an example, the reference location 260 may be two meters behind the vehicle 50 (e.g., from the reference location 262).

In the example scenario 320, the vehicle 322 and portions of the vehicles 324-326 may be within the field of view 252a-252b of the rear lens 112c. In the example scenario 320, the vehicle 324 may be within the field of view 254a-254b of the driver side lens 112f and the vehicle 322 and the vehicle 326 may not be within the field of view 254a-254b. In the example scenario 320, the vehicle 326 may be within the field of view 256a-256b of the passenger side lens 112d and the vehicle 322 and the vehicle 324 may not be within the field of view 256a-256b.

Figure 6:
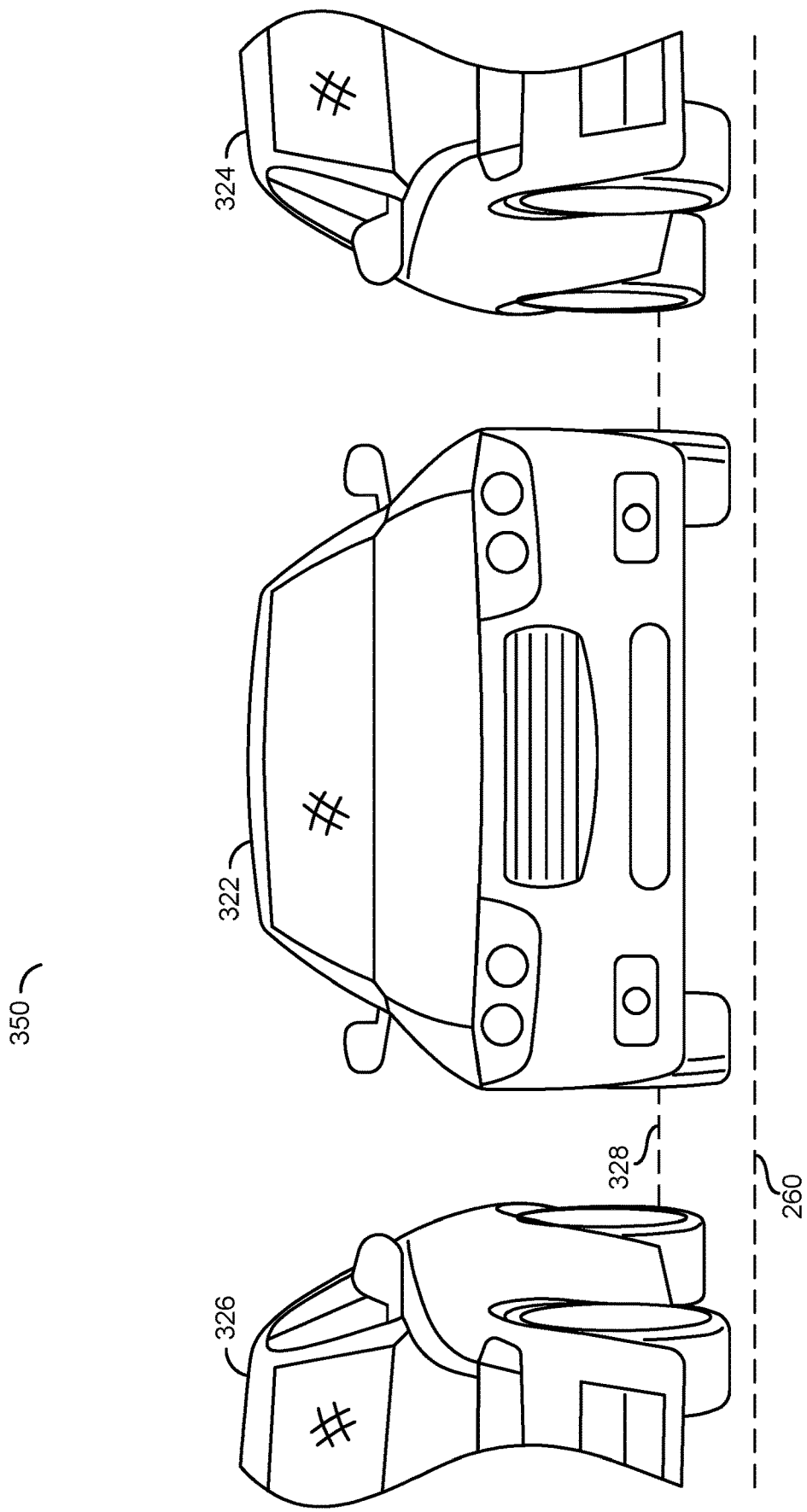
FIG. 6 is a diagram illustrating an example rectilinear video frame captured by a rear camera.

Referring to FIG. 6, a diagram illustrating an example rectilinear video frame 350 captured by the rear camera 102c is shown. The example rectilinear video frame 350 may be an example of a video frame captured by an ideal pinhole camera with a 90 degree field of view (FOV) lens and a 6 mm sensor. In an example, the rectilinear video frame 350 may be one of the video frames FRAMES_C captured by the capture device 102c via the lens 112c and presented to the processors 106a-106n.

The example rectilinear video frame 350 may comprise a front view of the vehicle 322. A portion of the vehicle 324 is shown in the rectilinear video frame 350. A portion of the vehicle 326 is shown in the rectilinear video frame 350. The content of the rectilinear video frame 350 may generally correspond with the field of view 252a-252b shown in the example scenario 320 in association with FIG. 5. For clarity, the reference location 260 is shown in front of the vehicles 322-326 and the reference location 328 is shown behind the vehicles 322-326.

If the rectilinear video frame 350 is used by the processors 106a-106n for the video stitching operations in order to generate the panoramic video frame 300, the rectilinear video frame 350 may need to be scaled down to match a size continuity of objects (e.g., the vehicles 322-326) in other video frames of the panoramic video frame 300, which would increase the invalid area. Scaling down the rectilinear video frame 350 may be undesirable.

In some embodiments, the lens characteristics of the lens 112c may enable the rectilinear video frame 350 to be captured. The processors 106a-106n may perform video operations to digitally warp the rectilinear video frame 350 to generate a non-rectilinear video frame. The non-rectilinear video frame generated from the rectilinear video frame 350 may be used as the portion 310b for the video stitching operations in order to generate the panoramic video frame 300. In some embodiments, the apparatus 100 may not capture the rectilinear video frame 350. For example, the lens characteristics of the lens 112c may be selected to have a particular amount of distortion to generate the video frames FRAMES_C having the warping present and the processors 106a-106n may perform the video stitching operations using the non-rectilinear video frame.

Figure 7:
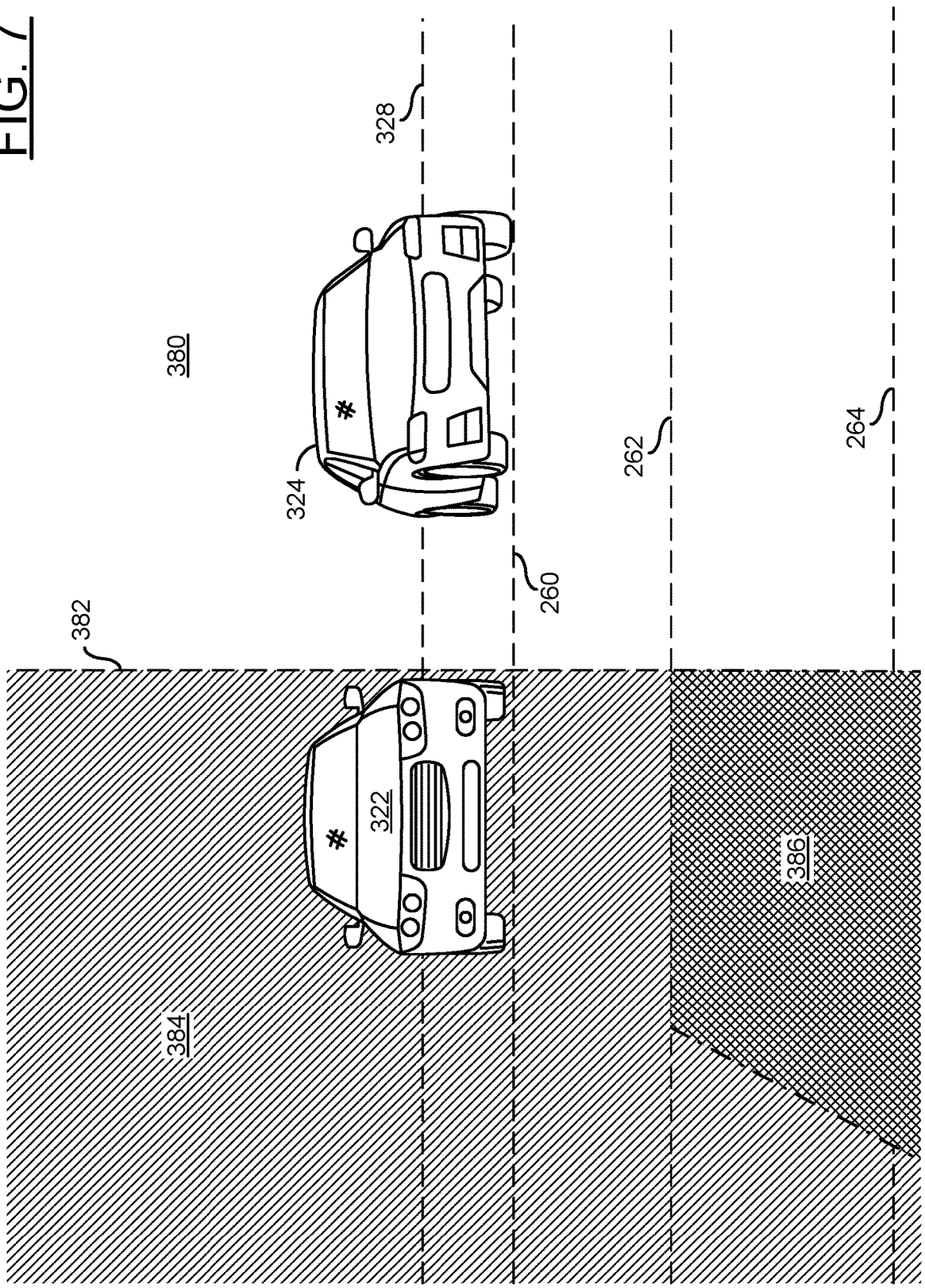
FIG. 7 is a diagram illustrating an example rectilinear video frame captured by a side camera.

Referring to FIG. 7, a diagram illustrating an example rectilinear video frame 380 captured by the driver side camera 102f is shown. The example rectilinear video frame 380 may be an example of a video frame captured by an ideal pinhole camera with a 90 degree field of view (FOV) lens and a 6 mm sensor pointing backwards on the left side of the vehicle 50. In an example, the rectilinear video frame 380 may be one of the video frames FRAMES_F captured by the capture device 102f via the lens 112f and presented to the processors 106a-106n.

The example rectilinear video frame 380 may comprise a front and side view of the vehicle 324. The content of the rectilinear video frame 380 may generally corresponds with the field of view 254a-254b shown in the example scenario 320 in association with FIG. 5. For clarity, the reference location 260 is shown in front of the vehicle 324 and the reference location 328 is shown behind the vehicles 324. The reference location 264 is shown and the reference location 262 are also shown.

In some embodiments, the lens characteristics of the lens 112f may enable the rectilinear video frame 380 to be captured. The processors 106a-106n may perform video operations to digitally warp the rectilinear video frame 380 to generate a non-rectilinear video frame. The non-rectilinear video frame generated from the rectilinear video frame 380 may be used as the portion 310c for the video stitching operations in order to generate the panoramic video frame 300. In some embodiments, the apparatus 100 may not capture the rectilinear video frame 380. For example, the lens characteristics of the lens 112f may be selected to have a particular amount of distortion to generate the video frames FRAMES_F having the warping present and the processors 106a-106n may perform the video stitching operations using the non-rectilinear video frame.

A dotted vertical line 382 is shown at the left edge of the rectilinear video frame 380. An area 384 is shown to the left of the line 382. The vehicle 322 is shown in the area 384. An area 386 is shown. The area 386 may represent a location of where the vehicle 50 would be (e.g., as if a person were standing at the location of the lens 112f). For example, the area 386 may generally correspond to an invalid area. The left area 384, encompassing the vehicle 322, is not actually visible in the left camera image since the area 384 would be obstructed by the car 50. The left area 384 is shown for illustrative purposes to indicate the size of the vehicle 322 at the distance D3 (e.g., the distance from the driver side lens 112f and the vehicle 322).

Comparing the rectilinear video frame 350 shown in association with FIG. 6 and the rectilinear video frame 380 shown in association with FIG. 7, the size of the vehicles (e.g., the vehicle 322 and the vehicle 324) may be approximately 2.5 times smaller (in each of width and height) in the rectilinear video frame 380 (and the hypothetical area 384) compared to the rectilinear rear view video frame 350. The reason for the object size difference is due to the approximately three meter distance difference between the rear camera lens 112c and the driver side camera lens 112f.

If the rectilinear video frames 350 and 380 were stitched together, there would be a size discontinuity between the vehicle 324 from the rear rectilinear video frame 350 and the vehicle 324 in the rectilinear video frame 380. A size discontinuity may be visually jarring, cause distraction and is undesirable. To keep size continuity for the vehicle 324 using only rectilinear video frames, the video processors 106a-106n would have to perform a scaling operation (e.g., to downscale the rectilinear video frame 350 or upscale the rectilinear video frame 380 approximately two and a half times). Scaling the rectilinear video frame 350 and/or the rectilinear video frame 380 may be undesirable because the resulting panoramic video frame 300 would have a large invalid area 312.

Figure 8:
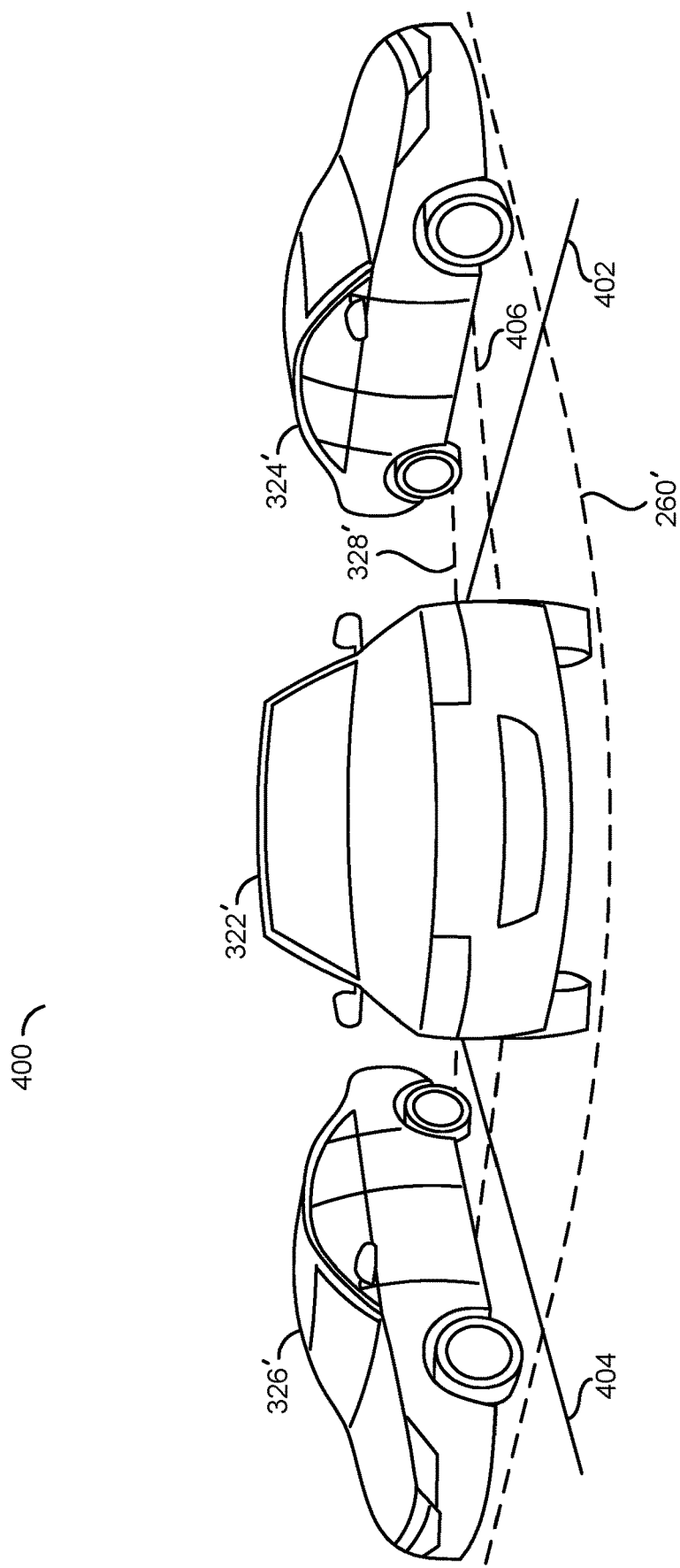
FIG. 8 is a diagram illustrating an example non-rectilinear video frame captured by a rear camera.

Referring to FIG. 8, a diagram illustrating an example non-rectilinear video frame 400 captured by the rear camera 102c is shown. The example non-rectilinear video frame 400 may be an example of a video frame captured by a camera with a 90 degree field of view (FOV) lens and a 6 mm sensor. The non-rectilinear video frame 400 may be one of the distorted frames generated by the processors 106a-106n. In one example, the non-rectilinear video frame 400 may be one of the video frames FRAMES_C captured by the capture device 102c via the lens 112c having a barrel/fisheye lens characteristic and presented to the processors 106a-106n. In another example, the non-rectilinear video frame 400 may be generated by the processors 106a-106n (e.g., using the video pipeline 156) in response to a warping video operation on the rectilinear video frame 350 shown in association with FIG. 6.

The example non-rectilinear video frame 400 may comprise a front view of the vehicle 322'. An angled view of the vehicle 324' is shown in the non-rectilinear video frame 400. An angled view of the vehicle 326' is shown in the rectilinear video frame 400. The content of the non-rectilinear video frame 400 may generally correspond with the field of view 252a-252b shown in the example scenario 320 in association with FIG. 5. For clarity, the reference location 260' is shown in front of the vehicles 322'-326' and the reference location 328' is shown behind the vehicles 322'-326'.

A line 402 is shown between the vehicle 322' and the vehicle 324'. A line 404 is shown between the vehicle 322' and the vehicle 326'. The lines 402-404 may correspond to line markings between the vehicles 322'-326'. The lines 402-404 may help illustrate the non-rectilinear effect. A line 406 is shown between the line 260' and the line 328'. The line 406 may be a reference location.

In some embodiments, the lens characteristics of the lens 112c may enable the processors 106a-106n to receive the non-rectilinear video frame 400. In one example, the lens characteristics may be a fisheye and/or barrel distortion. In another example, the lens characteristics may be a panoramic lens that exhibits fisheye/barrel lens distortion along the horizontal direction and the sensor 140a may have a 6 mm sensor size. In some embodiments, the processors 106a-106n may perform video operations to digitally warp the rectilinear video frame 350 to generate the non-rectilinear video frame 400. The non-rectilinear video frame generated from the rectilinear video frame 350 may be used as the portion 310b for the video stitching operations in order to generate the panoramic video frame 300.

The apparatus 100 may use non-rectilinear processes in the formation of the camera views. The non-rectilinear view may cause distortion of the objects in the non-rectilinear video frame 400. The apparatus 100 may leverage the distortion for generating the panoramic video frame 300 with desirable attributes (e.g., size continuity at stitching points, reduced invalid area 312, reduced scaling, etc.). With judicious choice of lens characteristics for the side cameras (e.g., 102d and 102f), object sizes may be similarly matched over a wide range of distances between the rear and side views across a stitching point.

In an example, the non-rectilinear video frame 400 may result in the vehicle 322' (e.g., located directly 2 meters behind the rear camera 102c) being similarly sized as in the rectilinear video frame 400 shown in association with FIG. 6, except there is a barrel (or bowed) effect. The distortion of the vehicle 322' in the non-rectilinear video frame 400 results in a gradual shrinking in height at locations moving horizontally away from the center of non-rectilinear video frame 400.

The non-rectilinear effects result in objects located even further away from the center of the non-rectilinear video frame 400 having an even smaller vertical size. For example, the vehicles 324'-326' shown at either edge of the non-rectilinear video frame 400 may have reduced heights of approximately 55% of the center-location height size.

In the example shown, the reference location line 260', the reference location line 328' and the reference line 406 appear curved. The curve may appear more significant at the edge of the non-rectilinear video frame 400. By comparison, the lines 260 and 328 are shown as horizontal lines in the rectilinear video frame 350 shown in association with FIG. 6. Additionally, the distortion of the lens 112c and/or the warping generated by the processors 106a-106n may result in a wide view (e.g., more of the side doors of the vehicles 324'-326' are shown compared to the vehicles 324-326 shown in the rectilinear video frame 350 shown in association with FIG. 6). The lane lines 402-404 that approach the lens 112c may have a distortion effect of flaring out to the sides.

Figure 9:
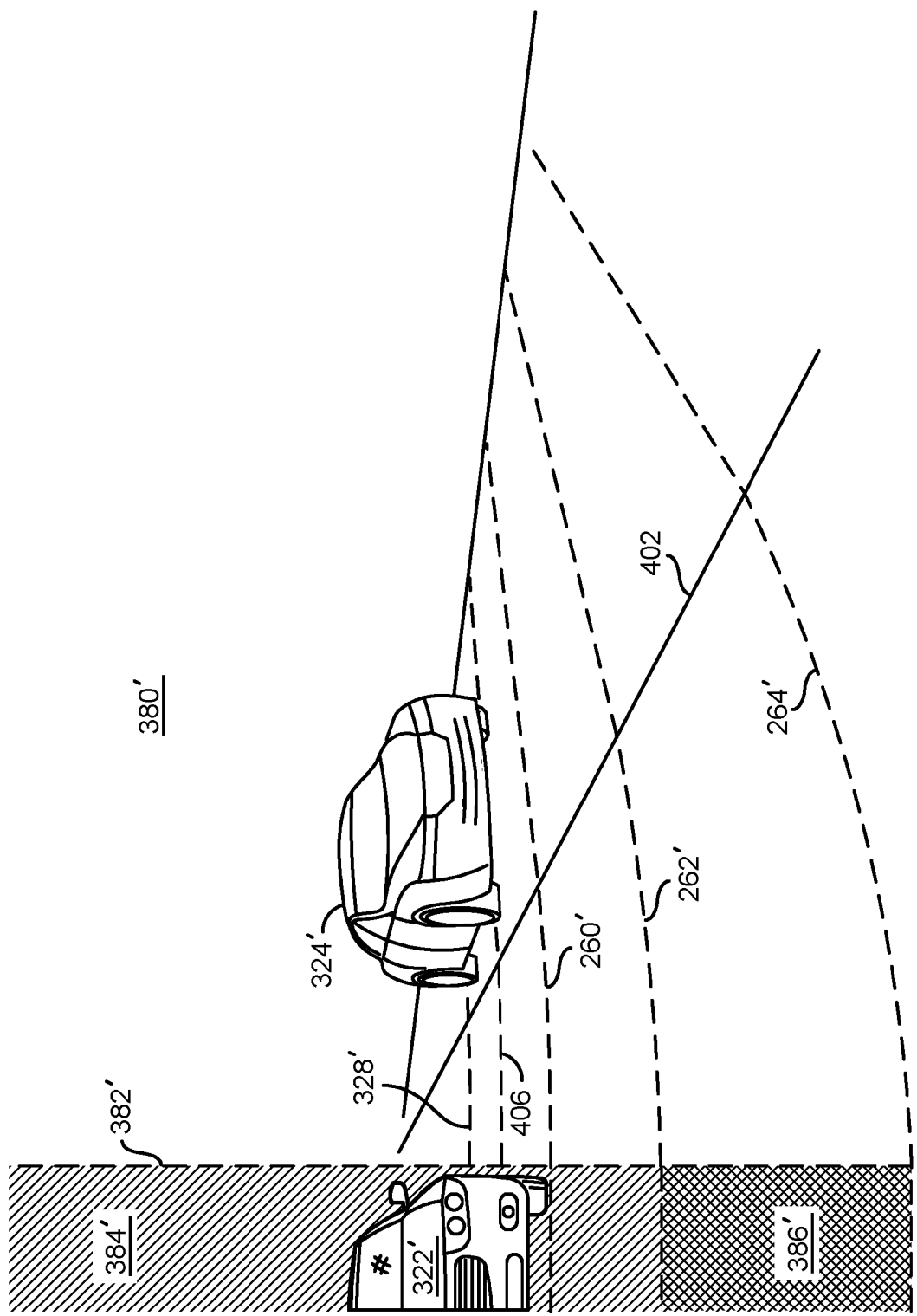
FIG. 9 is a diagram illustrating an example, non-rectilinear video frame captured by a side camera.

Referring to FIG. 9, a diagram illustrating an example, non-rectilinear video frame 380' captured by a driver side camera 102f is shown. The example non-rectilinear video frame 380' may be an example of a video frame captured by a camera with a 70 degree field of view (FOV) lens and a 6 mm sensor pointing backwards on the left side of the vehicle 50 (e.g., the left side camera may also be angled outwards at approximately 30 degrees to gain more visibility towards the sides of the car 50). The non-rectilinear video frame 380' may be one of the distorted frames generated by the processors 106a-106n. In one example, the non-rectilinear video frame 380' may be one of the video frames FRAMES_F captured by the capture device 102f via the lens 112f having a barrel/fisheye lens characteristic and presented to the processors 106a-106n. In another example, the non-rectilinear video frame 380' may be generated by the processors 106a-106n (e.g., using the video pipeline 156) in response to a warping video operation on the rectilinear video frame 380 shown in association with FIG. 7.

The example non-rectilinear video frame 380' may comprise a front and side view of the vehicle 324'. The content of the non-rectilinear video frame 380' may generally correspond with the field of view 254a-254b shown in the example scenario 320 in association with FIG. 5. For clarity, the reference location 260' is shown in front of the vehicle 324' and the reference location 328' is shown behind the vehicles 324'. The reference location 264' is shown, the reference location 262' and the reference location 406 are also shown.

In some embodiments, the lens characteristics of the lens 112f may enable the non-rectilinear video frame 380' to be captured. In some embodiments, the processors 106a-106n may perform video operations to digitally warp the rectilinear video frame 380 to generate the non-rectilinear video frame 380'. The non-rectilinear video frame 380' generated from the rectilinear video frame 380 may be used as the portion 310c for the video stitching operations in order to generate the panoramic video frame 300. In some embodiments, the apparatus 100 may not capture the rectilinear video frame 380. For example, the lens characteristics of the lens 112f may be selected to have a particular amount of distortion to generate the video frames FRAMES_F having the warping present and the processors 106a-106n may perform the video stitching operations using the non-rectilinear video frame 380'. The dotted vertical line 382' is shown at the left edge of the non-rectilinear video frame 380'. The area 384' is shown to the left of the line 382'. The vehicle 322' is shown in the area 384'. The area 386' is shown. The line 382', the left area 384', the vehicle 322' and the area 386' are shown for illustrative purposes to indicate the size of the vehicle 322' at the distance D3 (e.g., the distance from the driver side lens 112f and the vehicle 322') corresponding to the non-rectilinear video frame 380'.

Comparing the non-rectilinear video frame 400 shown in association with FIG. 8 and the non-rectilinear video frame 380' shown in association with FIG. 9, the size of the vehicles (e.g., the vehicle 322' and the vehicle 324') may be closer in size. The vehicle 322' may appear larger in the non-rectilinear video frame 400, but the vehicle 324' becomes smaller (e.g., at the edge of the non-rectilinear video frame 400 due to the warping). Since the vehicle 322' is not shown in both non-rectilinear video frames 400 and 380', a size difference between the vehicle 322' and the vehicle 324' may not be visually distracting or misleading to the driver 202. The size of the vehicle 324' may be similar between the non-rectilinear video frame 400 (e.g., from the rear camera 102c) and the non-rectilinear video frame 380' (e.g., from the driver side camera 102f). Since the vehicle 324' appears in both the non-rectilinear video frame 400 and the non-rectilinear video frame 380', to prevent distractions for the driver 202, the warping created by the apparatus 100 may be selected to match (or have the sizes close) the height of the vehicle 324' from the non-rectilinear video frame 400 and the vehicle 324' from the non-rectilinear video frame 380'. The reason for the object size matching is due to the warping (e.g., due to the distortion of each lens or from digital warping implemented by the processors 106a-106n) selected to compensate for the approximately three meter distance difference between the rear camera lens 112c and the driver side camera lens 112f. Objects closer to the rear lens 112c at the outer edge of the rear non-rectilinear video frame 400 may have a reduced height and may match the height of objects that are farther from the driver side lens 112f and located centrally in the driver side non-rectilinear video frame 380'.

Figure 10:
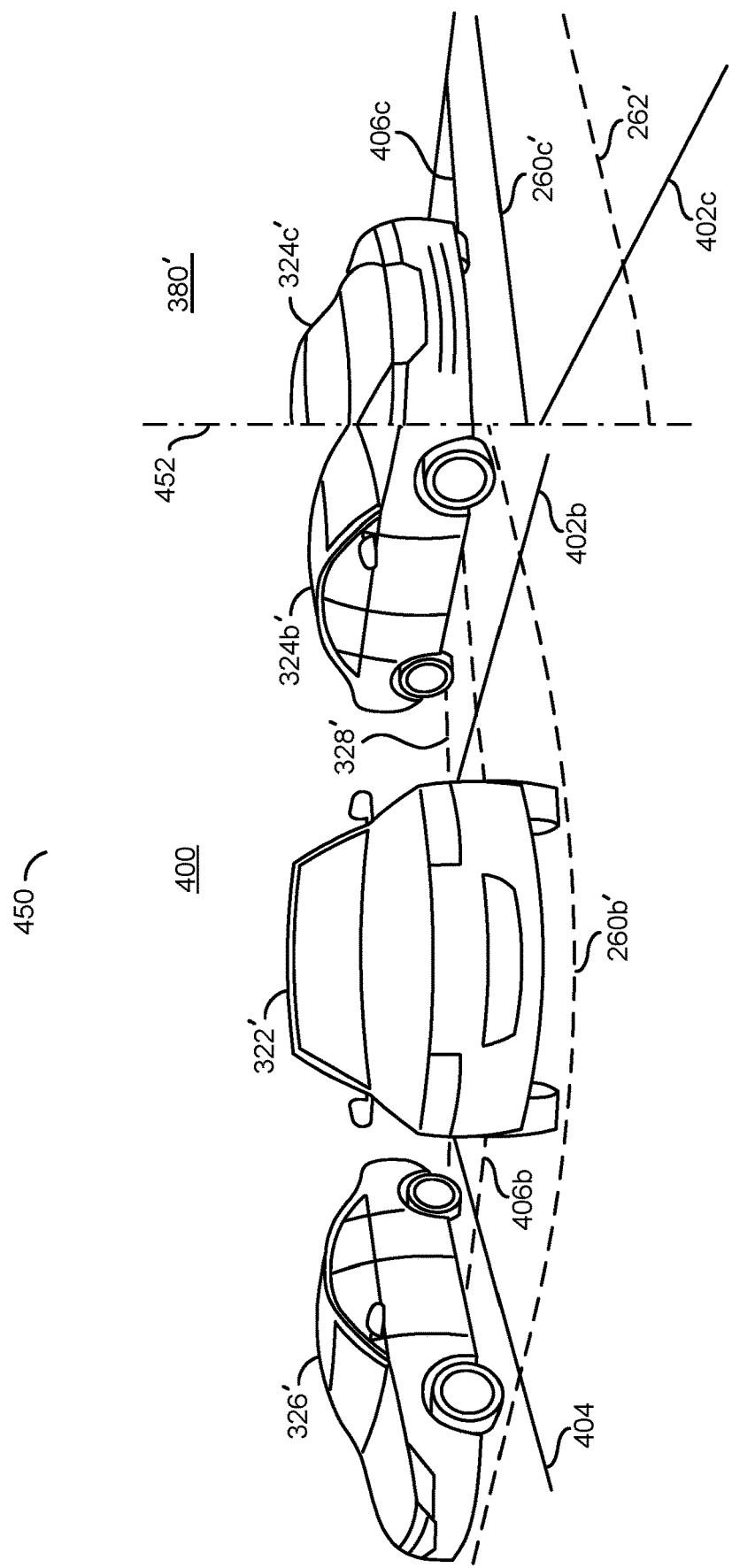
FIG. 10 is a diagram illustrating an example stitching seam.

Referring to FIG. 10, a diagram illustrating an example stitching seam is shown. A stitched video frame 450 is shown. The stitched video frame 450 may comprise the rear non-rectilinear video frame 400 and the driver side non-rectilinear video frame 380'. In an example, the stitched video frame 450 may be a portion of the panoramic video frame 300 (e.g., the portion 310b and the portion 310c).

Most of the rear non-rectilinear video frame 400 is shown in the stitched video frame 450. A portion of the driver side non-rectilinear video frame 400 is shown in the stitched video frame 450. The processors 106a-106n may be configured to determine how much (e.g., a ratio) of each of the non-rectilinear video frames to use in the video stitching operations. A vertical line 452 is shown. The vertical line 452 may represent a stitching seam. The stitching seam 452 may be where one edge of the non-rectilinear video frame 400 and another edge of the non-rectilinear video frame 380' are connected together. The video operations performed by the video pipeline 156 of the processors 106a-106n may perform the video stitching operations to connect the non-rectilinear video frame 400 and the non-rectilinear video frame 380'.

The stitching seam 452 may be chosen to be at a good location for viewing passing cars in an adjacent lane. The stitching operations performed by the processors 106a-106n may not merely connect two video frames edge-to-edge. The stitching operations may comprise intelligently selecting a location on each frame to perform the stitching operation, performing blending to reduce overlap, adding masking to hide artifacts, etc. The video operations performed for generating the stitching seam 452 and/or the location of the stitching seam 452 selected may be varied according to the design criteria of a particular implementation.

The vehicle 322' and the vehicle 326' are shown in the non-rectilinear video frame 400. The lines 328' and the line 404 are shown in the non-rectilinear video frame 400. The line 262' is shown in the non-rectilinear video frame 380'. Other objects in the non-rectilinear video frame 400 may cross the threshold seam 452. For example, the line 260b', the line 406b and the line 402b of the non-rectilinear video frame 400 may cross the threshold seam 452, and appear in the non-rectilinear video frame 380' as the line 260c', the line 406c and the line 402c, respectively. In the example shown, there may be some discontinuity of the line 406b to 406c and/or the line 402b to the line 402c across the stitching seam 452.

A portion of the vehicle 324b' is shown in the stitched video frame 450. Another portion (e.g., the front end) of the vehicle 324b' may be cut off at the stitching seam 452. A portion of the vehicle 324c' is shown in the non-rectilinear video frame 450. Another portion (e.g., the back end) of the vehicle 324c' may be cut off at the stitching seam 452. For example, the processors 106a-106n may crop out portions of the non-rectilinear video frame 400 and the non-rectilinear video frame 380' when performing the stitching operations.

The stitching seam 452 may cause a perspective discontinuity between the object 324b'-324c'. The discontinuity may be caused by the different locations and/or viewing angles of the lens 112c and the lens 112f. In the example shown, the perspective discontinuity may be a change in angle of the vehicle 324b'-324c'. Generally, the perspective discontinuity may not cause confusion to the driver 202. For example, the perspective discontinuity may be less distracting to the driver 202 than a size discontinuity.

The apparatus 100 may prevent driver confusion by ensuring a size continuity of the object 324b'-324c'. Even though the object 324b'-324c' has the perspective discontinuity, the size of the object 324b'-324c' is generally continuous. In the example shown, the height of the vehicle 324b'-324c' is relatively matched across the stitching seam 452. Stitching the non-rectilinear video frames 400 and 380' together may eliminate and/or reduce a size discontinuity that would be present if the rectilinear video frames 350 and 380 were stitched together. The distortion caused by the warping may ensure the size continuity and may reduce the amount of scaling. Reduced scaling may result in a smaller invalid area 312 and/or similarly sized video frames for the portions 310a-310c.

In an example, the lens 112c may be selected having one type of lens characteristics that provide a particular amount of distortion. The lens 112f may also be selected having another type of lens characteristics that provide a particular amount of distortion. The amount of distortion of the lens 112c and the lens 112f may be selected so that the apparatus 100 generates a panoramic video frame 300 that results in the object size that may be similarly matched across the chosen stitching boundary 452.

In another example, the processors 106a-106n may generate the non-rectilinear video frames. The processors 106a-106n may perform a digital warping that may achieve the non-rectilinear image characteristics where objects become continuously and gradually scaled down in size the further the objects are from the center of the lens. The digital warping may achieve a match of object sizes over a wide range of object distances across the stitching boundary location 452. In some embodiments, the apparatus 100 may implement a combination of digital warping methods and optical lens distortion to achieve the non-rectilinear image characteristics. In one example, optical methods may provide higher resolutions compared to digital warping methods. In another example, the digital warping methods may provide greater flexibility to select the amount of warping based on the objects detected in the captured video frames. The amount of lens distortion and/or the amount of digital warping applied may be varied according to the design criteria of a particular implementation.

Figure 11:
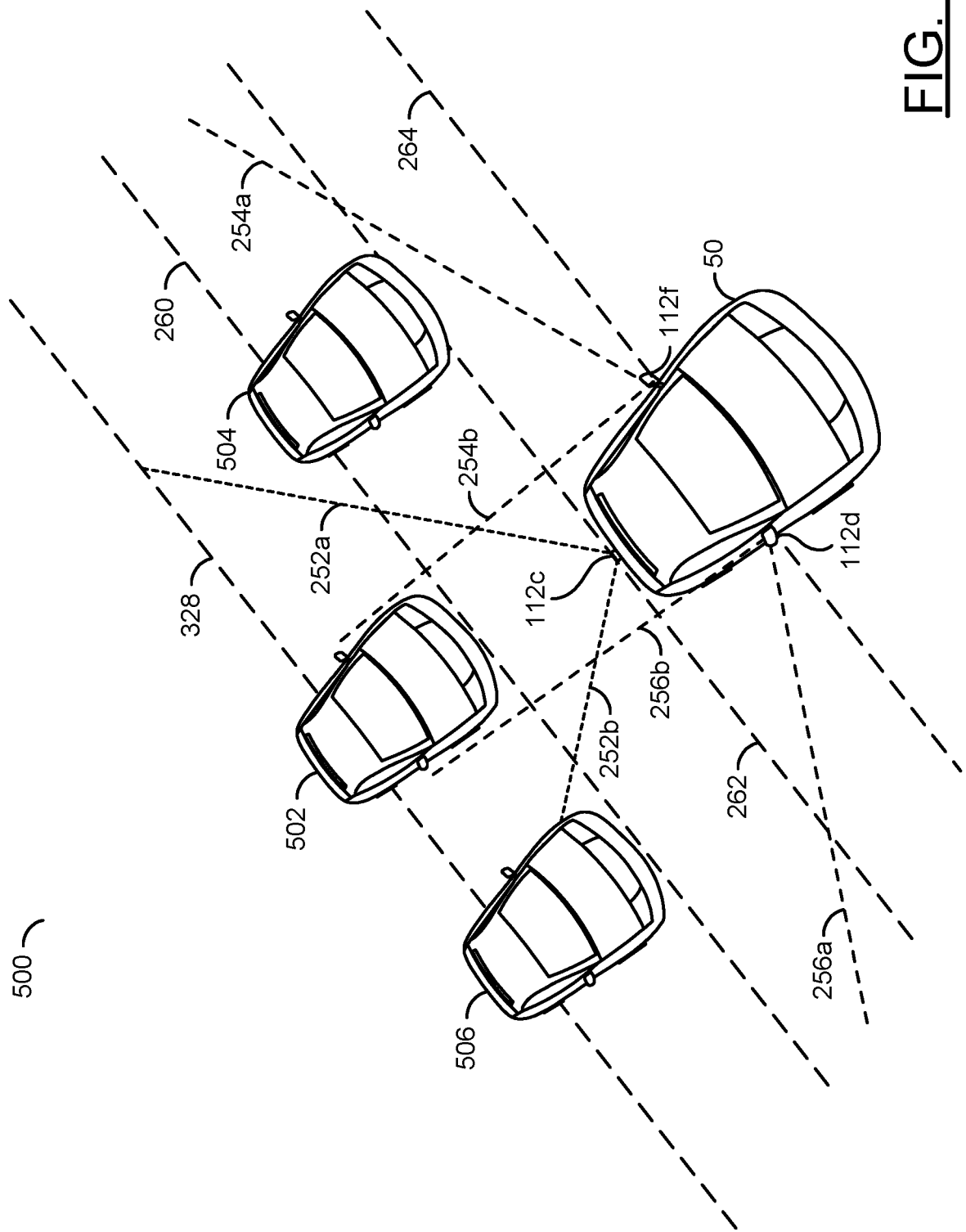
FIG. 11 is a diagram illustrating an example passing scenario.

Referring to FIG. 11, a diagram illustrating an example passing scenario 500 is shown. In the example passing scenario 500, the vehicle 50 is shown having the rear lens 112c, the passenger side lens 112d and the driver side lens 112f. The lens 112c may have the field of view 252a-252b, the lens 112f may have the field of view 254a-254b and the lens 112d may have the field of view 256a-256b. The reference location 328, the reference location 260, the reference location 262 and/or the reference location 264 are shown.

In the example passing scenario 500, a vehicle 502 may be directly behind the vehicle 50. In the example passing scenario 500, a vehicle 504 may be to the driver side of (e.g., left from the perspective of the driver 202) and slightly behind the vehicle 50. In the example passing scenario 500, a vehicle 506 may be to the passenger side of (e.g., right from the perspective of the driver 202) and behind the vehicle 50. A front end of the vehicle 502 may be at the reference line 260 and a rear end of the vehicle 502 may be at the reference line 328. A front end of the vehicle 504 may be at approximately the reference location 262 and a rear end of the vehicle 504 may be at the reference location 260. A front end of the vehicle 506 may be at the reference location 260 and a rear end of the vehicle 506 may be at the reference location 328. In the example passing scenario 500, the vehicle 504 may be in a position to pass the vehicle 50 (e.g., in a passing lane to the left of the vehicle 50). For example, the vehicle 504 may have advanced approximately three meters compared to the vehicle 502 and the vehicle 506.

Figure 12:
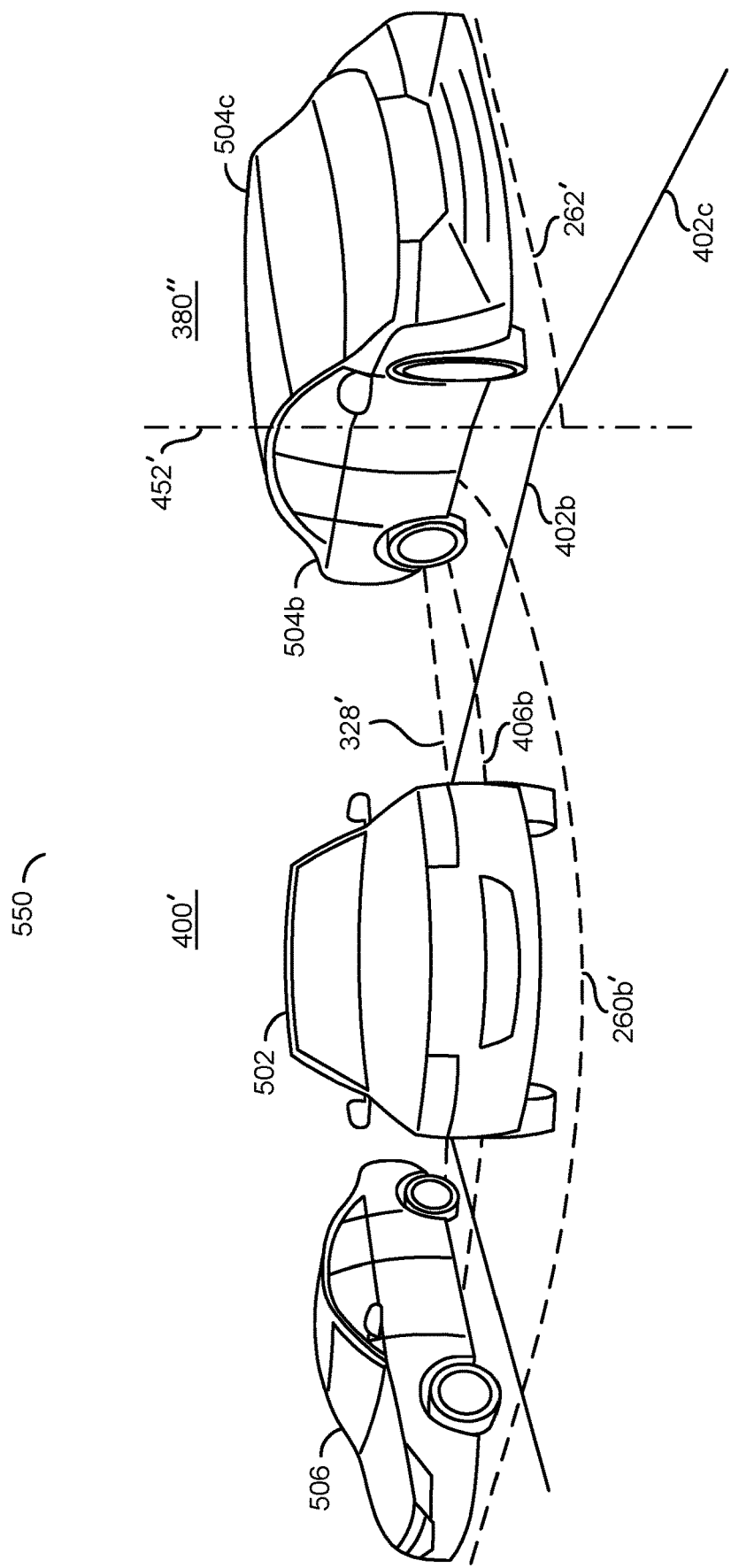
FIG. 12 is a diagram illustrating an example stitching seam for the passing scenario.

Referring to FIG. 12, a diagram illustrating an example stitching seam 452' for the passing scenario 500 is shown. An example stitched video frame 550 is shown. The example stitched video frame 550 may comprise the rear non-rectilinear video frame 400' captured using the lens 112c and the driver side non-rectilinear video frame 380" captured using the lens 112f. The example stitched video frame 500 may have an implementation similar to the stitched video frame 450 shown in association with FIG. 10.

The vehicle 502 and the vehicle 506 are shown in the non-rectilinear video frame 400'. The reference location 328' is shown in the non-rectilinear video frame 400'. The reference line 262' is shown in the non-rectilinear video frame 380".

Many objects from the non-rectilinear video frame 400' and the non-rectilinear video frame 380" may cross the stitching seam 452'. The reference line 260b'-260c' may cross the stitching seam 452'. The reference line 402b-402c may cross the stitching seam 452'. The vehicle 504b-504c may cross the stitching seam 452'.

Because of the distortion selected for the lens 112c and the lens 112f and/or because of the warping implemented by the processors 106a-106n, the passing vehicle 504b-504c may retain nearly equal object size crossing the stitching seam boundary 452'. The size of the object 504b-504c may be retained even as the object 504b-504c undergoes a perspective change distortion. Maintaining a size continuity at the stitch-crossing may be visually much more pleasant (e.g., even with the perspective-change distortion) than if the displayed object were to become abruptly discontinuous in size.

Figure 13:
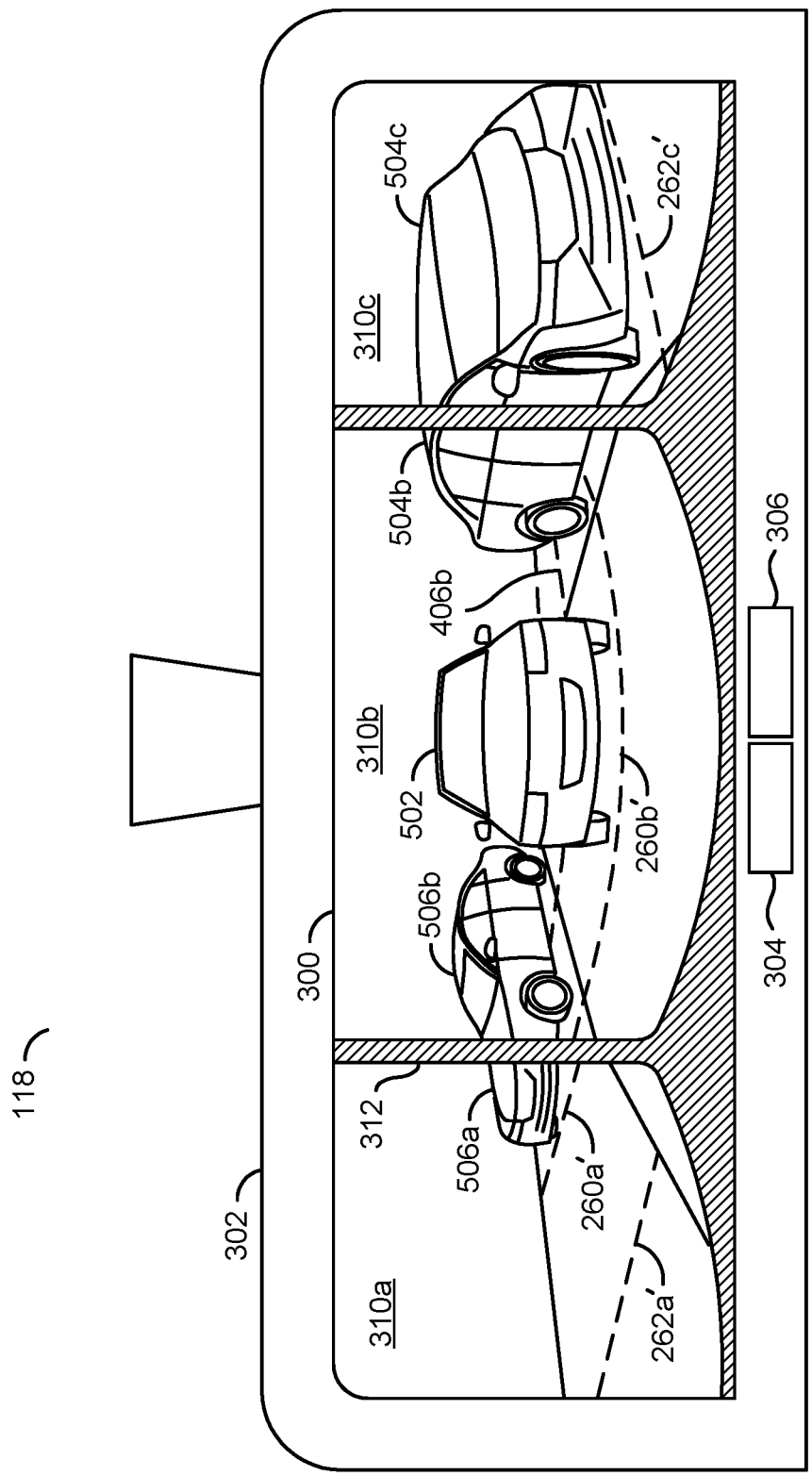
FIG. 13 is a diagram illustrating an example panoramic video frame output to an eMirror display.

Referring to FIG. 13, a diagram illustrating an example panoramic video frame 300 output to the eMirror display 118 is shown. The eMirror 118 is shown having the bezel 302, the button 304 and/or the button 306. The panoramic video frame 300 is shown on the eMirror display 118. Generally, a portion of the panoramic video frame 300 may correspond to the stitched video frame 550 shown in association with FIG. 12.

The panoramic video frame 300 may comprise the portions 310a-310c and the invalid area 312. For example, the portion 310a may correspond to the field of view 256a-256b captured by the passenger side lens 112d, the portion 310b may correspond to the field of view 252a-252b captured by the rear lens 112c and the portion 310c may correspond to the field of view 254a-254b captured by the driver side lens 112f. The panoramic video frame 300 may comprise the non-rectilinear video frame 400', the non-rectilinear video frame 380" and another non-rectilinear video frame corresponding to the video frames (e.g., the FRAMES_D) captured by the capture device 102d stitched together by the processors 106a-106n. The processors 106a-106n may add the invalid area 312 (e.g., as a mask layer) to the panoramic video frame 300 to hide stitching artifacts and/or other visual distractions.

Many of the objects and/or references shown in the panoramic video frame 300 may cross the invalid area 312 (e.g., the stitching seam) and appear across more than one of the portions 310a-310c. In the example shown, the vehicle 502 may appear in the portion 310b. In the example shown, a portion of the vehicle 506a-506b may appear in the portion 310a of the panoramic video frame 300 and a portion of the vehicle 506a-506b may appear in the portion 310b of the panoramic video frame 300. In the example shown, a portion of the reference location 406b may appear in the portion 310b of the panoramic video frame 300. In the example shown, a portion of the reference line 262a'-262c' may appear in the portion 310a of the panoramic video frame 300 and a portion of the reference line 262a'-262c' may appear in the portion 310c of the panoramic video frame 300. In the example shown, a portion of the reference location 260a'-260b' may appear in each of the portions 310a-310c of the panoramic video frame 300. In the example shown, a portion of the vehicle 504b-504c may appear in the portion 310b of the panoramic video frame 300 and a portion of the vehicle 504b-504c may appear in the portion 310c of the panoramic video frame 300.

The size continuity of the vehicle 506a-506b across the invalid area 312 (e.g., the stitching seam) between the portions 310a-310b may be preserved in the panoramic video frame 300. The size continuity of the vehicle 504a-504b across the invalid area 312 (e.g., the stitching seam) between the portions 310b-310c may be preserved in the panoramic video frame 300. In the example shown, the size continuity of objects in a single one of the portions 310a-310c (e.g., in each of the non-rectilinear video frames used) may not be preserved when moving from the center to the edge of the portions 310a-310c. The distortion of the lenses and/or the digital warping may result in a distortion of the size and/or shape of the objects. For example, the height of the vehicle 502 at the center of the portion 310b may be larger than the height of the vehicle portion 506b and the height of the vehicle portion 504b at the edges of the portion 310b. The change in height at the edges of the portions 310a-310c may be the characteristic of the distortion that is used by the apparatus 100 to maintain size continuity across the invalid area 312.

In the panoramic video frame 300, the vehicle 502 captured by the rear lens 112c may appear large when the apparatus 100 generates the panoramic video frame 300. For example, the distortion used to generate the non-rectilinear video frames for the portions 310a-310c may limit an amount of scaling needed to maintain the size continuity. Using the apparatus 100 may enable a license plate of cars positioned directly behind the rear camera 102c to be much more readable because of the increased size and resolution compared to downscaled images that would result if rectilinear video frames were used. For example, the apparatus 100 may be configured to operate as a dual purpose device simultaneously providing the panoramic video frames for the eMirror display 118 and as part of a digital video recording (DVR) system too (e.g., capable of reading license plates for insurance purposes) using only the capture devices 102c, 102d and 102f. Generally, capturing the identity of other vehicles in the scene with greatest clarity and resolution is a very important goal of a DVR system.

As a user-interface visual guidance to aid the driver 202, the processors 106a-106n may generate the invalid areas 312 as a mask to blend with the camera video images for forming the final signal VOUT for the eMirror display 118. The mask may shadow out some areas where the stitching seams are, to make the stitching seams less visually disturbing. For example, the discontinuity of some horizontal road lines across the 3 camera views could be visually muted with the mask implemented by the invalid area 312. The mask may also aid in suggesting the spatial relationship between viewing out of the rear window of the vehicle 50 and viewing out of the rear-side windows of the vehicle 50.

The apparatus 100 may be configured to make efficient use of the screen real estate of the eMirror display 118 (e.g., compared to the downscaling that is needed for stitched rectilinear video frames). The apparatus 100 may be configured to present more relevant scene information to the driver 202. More relevant scene information may be presented by prioritizing and/or devoting screen real estate of the eMirror display 118 to give more resolution (e.g., size/area) to objects/vehicles that are closer to the vehicle 50. Generally, situations where objects are close to the vehicle 50 may present a more urgent risk for the driver 202 to be aware of. For example, the decision module 158 may utilize the objects detected by the CNN module 150 to determine which objects are closer and which objects the driver 202 may need to be aware of.

The apparatus 100 may be configured to prevent more relevant scene information by keeping to a minimum the visual distraction that happens when an object crosses the stitch boundary between rear view 310b and side views (e.g., 310a and 310c). The apparatus 100 may prevent visual distraction by generating the panoramic video frames using non-rectilinear video frames that do not exhibit a large discontinuity in size at the edges. The shape of the object in the video frames may be warped and/or distorted such that the size of the objects where the video frames will be stitched together have approximately the same amount of height. The distortion and/or warping may reduce an amount of unused area (e.g., the invalid area 312) on the final output of the eMirror display 118 compared to the amount of unused if rectilinear video frames are scaled and stitched together.

The apparatus 100 may display the relevant information (e.g., maintain the size continuity at the stitching seams and/or reduce the invalid area 312) using non-rectilinear properties of lenses and/or non-rectilinear digital warping of images. The non-rectilinear properties may be selected to present objects close to the center of a camera with a large size, and reduce/taper down the size of the object(s) as the location is moved farther away from the camera center. The amount of distortion may be selected (e.g., either by selecting the lenses or determining the amount of digital warping to apply) to nearly match object sizes at the stitch boundary between rear and side views, over a wide range of object distances.

Figure 14:
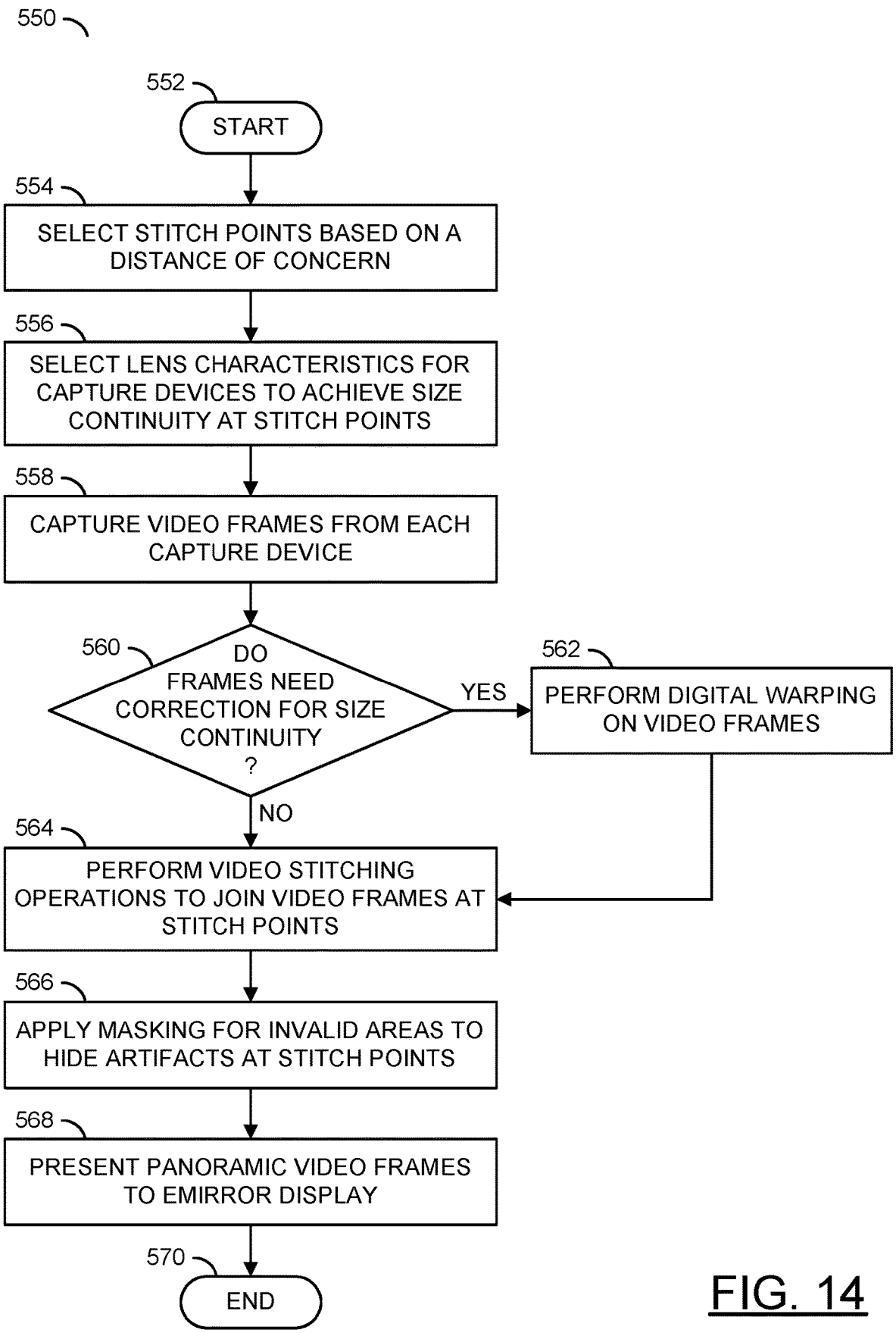
FIG. 14 is a flow diagram illustrating a method for selecting lens characteristics for size continuity.

Referring to FIG. 14, a method (or process) 550 is shown. The method 550 may select lens characteristics for size continuity. The method 550 generally comprises a step (or state) 552, a step (or state) 554, a step (or state) 556, a step (or state) 558, a decision step (or state) 560, a step (or state) 562, a step (or state) 564, a step (or state) 566, a step (or state) 568, and a step (or state) 570.

The step 552 may start the method 550. Next, in the step 554, one or more stitch points 452 may be selected based on a distance of concern. In the step 556, the lens characteristics may be selected for the capture devices 102a-102n. Next, in the step 558, each of the capture devices 102a-102n may capture the video frames (e.g., the signals FRAMESA-FRAMESN). Next, the method 550 may move to the decision step 560.

In the step 560, the processors 106a-106n may determine whether the video frames (e.g., the three portions 310a-310c) need correction for size continuity. In an example, the processors 106a-106n may be configured to correct potential errors in size continuity of the vehicles 502-506 (e.g., if a vehicle is outside of a particular range of distances, if an angle of the capture devices 102a-102n is changed, etc.) and/or adaptively select the stitching points. In an example, correcting the video frames may not be necessary, but may improve the experience of the driver 202. If the video frames do not need correction, the method 550 may move to the step 564. If the video frames 310a-310c do need correction, the method 550 may move to the step 562. In the step 562, the processors 106a-106n (e.g., based on operations performed by the video pipeline 156) may perform digital warping on the video frames. Next, the method 550 may move to the step 564.

In the step 564, the processors 106a-106n (e.g., based on operations performed by the video pipeline 156) may perform the video stitching operations to join the video frames (e.g., the non-rectilinear video frame 400' and the non-rectilinear video frame 380") at the stitching point (e.g., the stitching seam 452). Next, in the step 566, the processors 106a-106n (e.g., based on operations performed by the video pipeline 156) may apply masking to the stitched video frames 300 for the invalid areas 312. In an example, the invalid areas 312 may be a mask to hide visual artifacts (e.g., duplicated objects, stretched objects, deformed objects, etc.) at the stitching points 452. In the step 568, the processors 106a-106n may present the panoramic video frames 300 to the eMirror display 118. Next, the method 550 may move to the step 570. The step 570 may end the method 550.

The stitch point 452 may be selected based on the distance of concern. The stitch point 452 may be selected at a location desired to have object sizes equalized when crossing the stitch point 452. The location desired to have object sizes equalized when crossing the stitch point 452 may be the distance of concern. In one example, the distance of concern may be a distance behind the rear camera lens 112c of the vehicle 50 where the driver 202 would likely be concerned of another vehicle (e.g., the vehicle 324') being in close vicinity to the vehicle 50 and/or coming up from behind to pass. For example, statistical information, the characteristics of the vehicle 50 (e.g., size, sight-lines, etc.), computer vision and/or inferences made by the sensor fusion module 152 may be used to determine the distance of concern. In one example, the distance of concern may be approximately 3 meters from the vehicle 50. The characteristics of the lenses 112a-112n may be selected to provide the distortion corresponding to the stitching point 452 at the distance of concern.

The stitching point 452 selected may provide a wide range of distances from the vehicle 50 that would achieve the size continuity. In the example of the stitching point 452 corresponding to a 3 meter distance from the vehicle 50, objects in the range of 2 meters or more (e.g., approximately 6 meters) behind the vehicle 50 may have size continuity at the stitching point 452 and/or closely match in size (e.g., some differences may occur based on the distance). Objects closer than 2 meters from the vehicle 50 may become increasingly mismatched in size at the stitching seam 452 (e.g., there would be an inherent limitation due to the distance between the rear lens 112c and the side lenses (e.g., 112d and 112f). Objects very close to the vehicle 50 may be in a blind spot in the three camera setup. In some embodiments, for objects at a distance of greater than 6 meters there may be double-object artifacts (e.g., the object appears in both the rear view and the side view in the stitched panoramic video frame 300). In some embodiments, the apparatus 100 may be configured to adaptively adjust the location of the stitching seam 452 to prevent visual artifacts.

Figure 15:
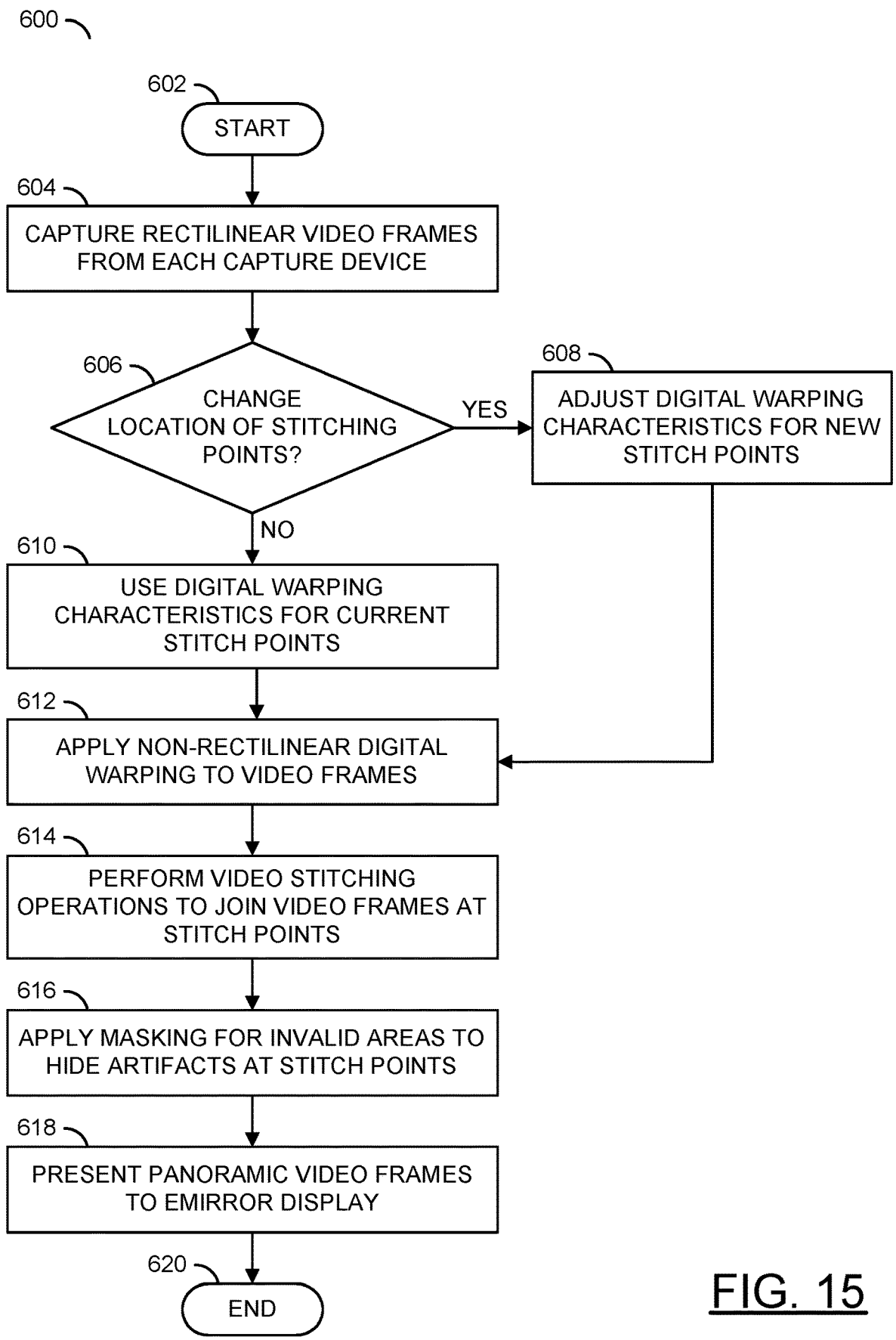
FIG. 15 is a flow diagram illustrating a method for digitally warping video frames to achieve size continuity.

Referring to FIG. 15, a method (or process) 600 is shown. The method 600 may digitally warp video frames to achieve size continuity. The method 600 generally comprises a step (or state) 602, a step (or state) 604, a decision step (or state) 606, a step (or state) 608, a step (or state) 610, a step (or state) 612, a step (or state) 614, a step (or state) 616, a step (or state) 618, and a step (or state) 620.

The step 602 may start the method 600. In the step 604, the capture devices 102a-102n may capture rectilinear video frames. Next, the method 600 may move to the decision step 606.

In the decision step 606, the processors 106a-106n may determine whether to change the location of the stitching points (e.g., the stitching seam 452). In an example, the processors 106a-106n may be configured to perform computer vision video analysis, computer vision object detection and/or use sensor fusion inferences to intelligently analyze the scenario in the video frames and determine where the stitching seam 452 should be located in real-time based on the locations of various objects. If the processors 106a-106n determine to change the location of the stitching points, the method 600 may move to the step 608. In the step 608, the processors 106a-106n may adjust the digital warping characteristics performed by the video pipeline (e.g., to provide size continuity at the newly selected stitching points). Next, the method 600 may move to the step 612. In the decision step 606, if the processors 106a-106n determine not to change the location of the stitching points, the method 600 may move to the step 610. In the step 610, the processors 106a-106n may use the digital warping characteristics for the current stitching points 452. Next, the method 600 may move to the step 612.

In the step 612, the processors 106a-106n may apply the non-rectilinear warping to the video frames. Next, in the step 614, the processors 106a-106n (e.g., based on operations performed by the video pipeline 156) may perform the video stitching operations to join the video frames 310a-310c at the stitching point (e.g., the stitching seam 452). Next, in the step 616, the processors 106a-106n (e.g., based on operations performed by the video pipeline 156) may apply masking to the stitched video frames 300 for the invalid areas 312. In the step 618, the processors 106a-106n may present the panoramic video frames 300 to the eMirror display 118. Next, the method 600 may move to the step 620. The step 620 may end the method 600.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive video frames corresponding to an exterior view of a vehicle generated by a plurality of capture devices; and
a processor configured to (a) perform digital warping on said video frames, (b) generate distorted video frames in response to said digital warping, (c) perform video stitching operations on said distorted video frames and (d) generate panoramic video frames in response to said video stitching operations, wherein (i) said digital warping is performed to adjust said video frames based on lens characteristics of said capture devices, (ii) an amount of said digital warping applied is selected to provide a size continuity of objects in said distorted video frames at a stitching seam in said panoramic video frames and (iii) said panoramic video frames are generated to fit a size of a display.

2. The apparatus according to claim 1, wherein said distorted video frames are non-rectilinear video frames.

3. The apparatus according to claim 1, wherein said digital warping is configured to provide a fisheye distortion.

4. The apparatus according to claim 1, wherein a size of objects in said distorted video frames are larger at a center of said distorted video frames and said size of said objects becomes smaller to the left and to the right of said center.

5. The apparatus according to claim 1, wherein an amount of said digital warping applied is determined based on a distance from said vehicle captured at said stitching seam.

6. The apparatus according to claim 1, wherein said size continuity is provided by applying said digital warping to reduce a size of objects in a first of said distorted video frames at a first edge to match said size of said objects in a second of said distorted video frames at a second edge.

7. The apparatus according to claim 1, wherein said panoramic video frames comprise three video frames stitched together.

8. The apparatus according to claim 7, wherein a first of said three video frames comprises said exterior view captured by one of said capture devices at a driver side of said vehicle, a second of said three video frames comprises said exterior view captured by one of said capture devices at a rear of said vehicle and a third of said three video frames comprises said exterior view captured by one of said capture devices at a passenger side of said vehicle.

9. The apparatus according to claim 8, wherein said second of said three video frames has a size similar to said first of said three video frames and said third of said three video frames in said panoramic video frames.

10. The apparatus according to claim 7, wherein said display receiving said panoramic video frames is a 3-in-1 eMirror.

11. The apparatus according to claim 1, wherein a portion of said panoramic video frames comprise an invalid area that does not output video data captured by said capture devices.

12. The apparatus according to claim 11, wherein said processor generates said invalid area to mask stitching artifacts.

13. The apparatus according to claim 11, wherein said invalid area is a small portion of said panoramic video frames.

14. A method for aligning a stitching seam of video frames, comprising the steps of:
(A) selecting first characteristics of a first lens that implements a first distortion;
(B) selecting second characteristics of a second lens that implements a second distortion;
(C) capturing a first video frame using a first capture device from a first location using said first lens;
(D) capturing a second video frame using a second capture device from a second location using said second lens;
(E) performing video stitching operations using a processor to generate a panoramic video frame comprising said first video frame and said second video frame, wherein said first video frame and said second video frame are joined in said panoramic video frame at said stitching seam; and
(F) presenting said panoramic video frame to a display device, wherein (i) said processor generates said panoramic video to fit a size of said display device, (ii) said first characteristics and said second characteristics are selected to provide a size continuity for objects at said stitching seam for a range of distances.

15. The method according to claim 14, wherein (i) a location of said stitching seam is selected based on a distance of concern and (ii) said distance of concern is determined based on where other vehicles attempt to pass.

16. The method according to claim 15, wherein said range of distances is determined with respect to said distance of concern.

17. The method according to claim 14, wherein said first distortion and said second distortion cause non-rectilinear perspectives in said first video frame and said second video frame.

18. The method according to claim 14, wherein said first distortion and said second distortion are a barrel distortion.

19. The method according to claim 14, further comprising a step of:
performing digital warping to said first video frame and said second video frame.

* * * * *